United States Patent
Lee et al.

(10) Patent No.: US 11,912,102 B2
(45) Date of Patent: Feb. 27, 2024

(54) PERFORATED MEMBER AND AIR CONDITIONER FOR VEHICLE HAVING SAME

(71) Applicant: Hanon Systems, Daejeon (KR)

(72) Inventors: Dong Won Lee, Daejeon (KR); Jong Su Kim, Daejeon (KR); Jae Woo Ko, Daejeon (KR); Young Keun Kim, Daejeon (KR); Chang Soo Bae, Daejeon (KR); Jong Min Lee, Daejeon (KR); Gyu Ik Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 886 days.

(21) Appl. No.: 16/595,566

(22) Filed: Oct. 8, 2019

(65) Prior Publication Data
US 2020/0108692 A1     Apr. 9, 2020

(30) Foreign Application Priority Data

Oct. 8, 2018 (KR) .......................... 10-2018-0119958
Feb. 20, 2019 (KR) .......................... 10-2019-0020004

(51) Int. Cl.
*B60H 1/00* (2006.01)
*B60H 3/02* (2006.01)

(52) U.S. Cl.
CPC ....... *B60H 1/00528* (2013.01); *B60H 1/0005* (2013.01); *B60H 3/024* (2013.01); *B60H 2001/00128* (2013.01); *B60H 2001/00135* (2013.01)

(58) Field of Classification Search
CPC .. B60H 1/00528; B60H 1/0005; B60H 3/024; B60H 2001/00128; B60H 2001/00135; B60H 1/2215; B60H 1/00321; B60H 1/00507
USPC .................................. 165/42, 202, 203, 204
See application file for complete search history.

(56) References Cited

U.S. PATENT DOCUMENTS

| | | | | |
|---|---|---|---|---|
| 1,752,038 | A | * | 3/1930 | Sunday .............. B60H 1/00335 96/386 |
| 2,160,269 | A | * | 5/1939 | Jorolemon ............ F24F 1/0073 126/116 R |
| 2,561,928 | A | * | 7/1951 | Johnston ................... E06B 7/03 454/216 |

(Continued)

FOREIGN PATENT DOCUMENTS

| | | | | |
|---|---|---|---|---|
| DE | 19954978 C1 | * | 1/2001 | .......... B60N 2/5635 |
| DE | 10348649 A1 | | 5/2005 | |

(Continued)

*Primary Examiner* — Ljiljana V. Ciric
(74) *Attorney, Agent, or Firm* — Dickinson Wright PLLC

(57) ABSTRACT

An air conditioner for a vehicle including an air-conditioning case divided into a plurality of air passageways by a separation wall. A heating heat exchanger is disposed inside the air-conditioning case and exchanges heat with air to heat the interior of the vehicle. A perforated member is disposed at a downstream side of the heating heat exchanger and has a plurality of perforated holes through which the air passing the heating heat exchanger passes, and a partition wall is disposed between the heating heat exchanger and the perforated member to divide the air passageway of the air-conditioning case into a plurality of air passageways, wherein the partition wall is formed integrally with the perforated member.

21 Claims, 19 Drawing Sheets

(56) References Cited

U.S. PATENT DOCUMENTS

| | | | | |
|---|---|---|---|---|
| 3,524,398 A * | 8/1970 | Winfrey | F24F 8/10 | 454/157 |
| 3,570,592 A * | 3/1971 | Rollins | B61D 27/0027 | 219/202 |
| 3,666,924 A * | 5/1972 | Jensen | F24H 3/0405 | 219/505 |
| 3,810,741 A * | 5/1974 | Stalego | C03B 37/091 | 65/499 |
| 3,906,740 A * | 9/1975 | Thomas | B60H 1/3229 | 165/41 |
| 3,964,458 A * | 6/1976 | Strauss | B60P 3/14 | 165/41 |
| 4,032,752 A * | 6/1977 | Ohmura | F01N 3/2013 | 252/514 |
| 4,034,204 A * | 7/1977 | Windsor | B60H 1/00457 | 219/202 |
| 4,064,934 A * | 12/1977 | Kolthoff, Jr. | F28F 27/00 | 165/DIG. 100 |
| 4,270,695 A * | 6/1981 | Carson | F24F 7/06 | 165/47 |
| 4,346,285 A * | 8/1982 | Nakamura | F24H 1/121 | 219/505 |
| 4,390,124 A * | 6/1983 | Nilsson | B60H 1/0065 | 165/41 |
| 4,459,466 A * | 7/1984 | Nakagawa | B60H 1/034 | 219/202 |
| 4,476,773 A * | 10/1984 | Fehr | F04D 29/462 | 415/206 |
| 4,483,151 A * | 11/1984 | Fujioka | F25D 11/022 | 62/157 |
| 4,852,639 A * | 8/1989 | Horiguchi | B60H 1/00071 | 237/12.3 A |
| 4,963,716 A * | 10/1990 | Van Den Elst | H05B 3/14 | 219/202 |
| 5,025,711 A * | 6/1991 | Cassidy | B60H 1/00857 | 454/126 |
| 5,028,763 A * | 7/1991 | Chung-Tai | H05B 3/14 | 338/53 |
| 5,062,352 A * | 11/1991 | Ostrand | B60H 1/00057 | 237/12.3 A |
| 5,123,258 A * | 6/1992 | Brown | F25D 19/003 | 165/53 |
| 5,125,070 A * | 6/1992 | Chung-Tai | H05B 3/14 | 219/505 |
| 5,162,020 A * | 11/1992 | Asano | B60H 1/00664 | 165/142 |
| 5,186,237 A * | 2/1993 | Adasek | B60H 1/00849 | 165/203 |
| 5,197,112 A * | 3/1993 | Cameron | H05B 3/14 | 219/505 |
| 5,206,476 A * | 4/1993 | Fresch | G05D 23/2401 | 219/202 |
| 5,326,315 A * | 7/1994 | Inoue | B60H 1/00692 | 454/126 |
| 5,450,894 A * | 9/1995 | Inoue | B60H 1/00842 | 454/907 |
| 5,505,251 A * | 4/1996 | Sarbach | B60H 1/03 | 219/202 |
| 5,571,432 A * | 11/1996 | Sarbach | B60H 1/2225 | 219/202 |
| 5,649,049 A * | 7/1997 | Abe | F01N 3/2828 | 422/174 |
| 5,653,630 A * | 8/1997 | Higashihara | B60H 1/00692 | 454/121 |
| 5,664,049 A * | 9/1997 | Kondo | H05B 3/12 | 422/174 |
| 5,676,595 A * | 10/1997 | Sumiya | B60H 1/00685 | 454/121 |
| 5,701,949 A * | 12/1997 | Yamaguchi | B60H 1/00664 | 237/12.3 A |
| 5,755,380 A * | 5/1998 | Virey | B60H 1/2225 | 237/12.3 R |
| 5,789,007 A * | 8/1998 | Bianco | A23B 7/148 | 454/181 |
| 5,881,558 A * | 3/1999 | Kawahara | B60H 1/00692 | 62/408 |
| 5,885,152 A * | 3/1999 | Wardlaw | B60H 1/00692 | 251/145 |
| 5,890,651 A * | 4/1999 | Kanda | B60H 1/00064 | 454/121 |
| 5,899,806 A * | 5/1999 | Hase | B60H 1/00692 | 454/160 |
| 5,950,711 A * | 9/1999 | Bendell | B60H 1/0005 | 237/12.3 A |
| 6,031,204 A * | 2/2000 | Prust | F02N 19/06 | 123/549 |
| 6,039,532 A * | 3/2000 | McConnell | F04D 29/422 | 415/206 |
| 6,048,263 A * | 4/2000 | Uchida | B60H 1/00842 | 165/204 |
| 6,062,298 A * | 5/2000 | Lee | B60H 1/00064 | 454/126 |
| 6,206,092 B1 * | 3/2001 | Beck | B60H 1/00064 | 165/203 |
| 6,242,712 B1 * | 6/2001 | Prust | F02M 31/13 | 123/549 |
| 6,254,475 B1 * | 7/2001 | Danieau | F24F 13/15 | 454/336 |
| 6,273,811 B1 * | 8/2001 | Pawlak, III | B60H 1/00692 | 165/42 |
| 6,278,083 B1 * | 8/2001 | Schwarz | B60H 1/0005 | 219/202 |
| 6,293,339 B1 * | 9/2001 | Uemura | B60H 1/00064 | 454/126 |
| 6,305,462 B1 * | 10/2001 | Tsurushima | B60H 1/00692 | 454/126 |
| 6,308,770 B1 * | 10/2001 | Shikata | F28D 1/0478 | 165/203 |
| 6,351,961 B1 * | 3/2002 | Kurokawa | B60H 1/0005 | 62/244 |
| 6,382,305 B1 * | 5/2002 | Sano | B60H 3/0608 | 165/103 |
| 6,427,770 B2 * | 8/2002 | Beck | F28D 1/0435 | 165/203 |
| 6,439,296 B1 * | 8/2002 | Arold | B60H 1/00664 | 237/12.3 R |
| 6,547,301 B1 * | 4/2003 | Keller | B60H 1/00564 | 165/42 |
| 6,569,009 B2 * | 5/2003 | Nishikawa | B60H 1/00692 | 454/121 |
| 6,581,678 B1 * | 6/2003 | Groemmer | B60H 1/00064 | 454/156 |
| 6,607,029 B2 * | 8/2003 | Danieau | B60H 1/00671 | 454/126 |
| 6,607,433 B2 * | 8/2003 | Vincent | B60H 1/00842 | 454/143 |
| 6,609,563 B1 * | 8/2003 | Tsurushima | B60H 1/00692 | 165/72 |
| 6,612,922 B2 * | 9/2003 | Uemura | B60H 1/00692 | 454/121 |
| 6,669,549 B2 * | 12/2003 | Uemura | B60H 1/00692 | 454/159 |
| 6,749,656 B2 * | 6/2004 | Paumier | B60H 1/3407 | 264/DIG. 48 |
| 6,758,742 B2 * | 7/2004 | Farag | B60H 1/00835 | 165/42 |
| 6,786,541 B2 * | 9/2004 | Haupt | B60N 2/5635 | 297/452.42 |
| 6,808,230 B2 * | 10/2004 | Buss | B60N 2/5657 | 297/180.12 |
| 6,857,697 B2 * | 2/2005 | Brennan | B60N 2/5635 | 297/180.12 |
| 6,935,835 B2 * | 8/2005 | Della Mora | F04D 29/422 | 415/206 |
| 7,052,091 B2 * | 5/2006 | Bajic | B60N 2/5635 | 297/180.12 |
| 7,063,131 B2 * | 6/2006 | Northrop | F28F 1/24 | 422/198 |

(56) References Cited

U.S. PATENT DOCUMENTS

| | | | |
|---|---|---|---|
| 7,431,127 B2* | 10/2008 | de Borchgrave | F04D 29/664 181/210 |
| 7,520,804 B2* | 4/2009 | Venkatappa | B60H 1/00685 454/145 |
| 7,802,615 B2* | 9/2010 | Martinus | F24F 13/24 392/377 |
| 7,927,684 B2* | 4/2011 | Comeaux | B32B 25/20 442/99 |
| 8,017,891 B2* | 9/2011 | Nevin | H05B 3/286 219/549 |
| 8,397,795 B2* | 3/2013 | Seto | F28D 1/05366 165/41 |
| 8,443,872 B2* | 5/2013 | Seto | F28D 1/05391 165/41 |
| 8,474,513 B2* | 7/2013 | Koukouravas | B60H 1/00671 165/203 |
| 8,541,721 B2* | 9/2013 | Moskal | B21D 31/02 219/539 |
| 8,601,824 B2* | 12/2013 | Jun | B60N 2/5657 62/3.4 |
| 8,777,320 B2* | 7/2014 | Stoll | B60N 2/5621 297/180.13 |
| 8,840,452 B2* | 9/2014 | Han | B60H 1/00692 454/145 |
| 9,055,820 B2* | 6/2015 | Axakov | A47C 7/744 |
| 9,180,751 B2* | 11/2015 | Han | B60H 1/00692 |
| 9,415,712 B2* | 8/2016 | Stoll | B60N 2/5685 |
| 9,744,890 B2* | 8/2017 | Nii | B60N 2/5678 |
| 10,308,094 B2* | 6/2019 | Capellmann | B60H 1/00028 |
| 10,518,606 B2* | 12/2019 | Aizawa | B60H 1/0005 |
| 2001/0001417 A1* | 5/2001 | Beck | F28D 1/0435 165/203 |
| 2003/0013404 A1* | 1/2003 | Uemura | B60H 1/00692 454/121 |
| 2006/0046632 A1* | 3/2006 | Goupil | B60H 1/00692 454/121 |
| 2006/0046633 A1* | 3/2006 | Goupil | B60H 1/00692 454/121 |
| 2007/0023180 A1 | 2/2007 | Komarek et al. | |
| 2015/0191074 A1 | 7/2015 | Derx et al. | |
| 2018/0328332 A1* | 11/2018 | Tonkin | H05B 1/0236 |

FOREIGN PATENT DOCUMENTS

| | | | |
|---|---|---|---|
| DE | 19646123 B4 * | 3/2008 | B60H 1/00064 |
| DE | 102012012654 A1 | 1/2014 | |
| EP | 2433825 A1 * | 3/2012 | B60H 1/00685 |
| JP | H06143984 A | 5/1994 | |
| JP | H10324145 A | 12/1998 | |
| JP | 2007508191 A | 4/2007 | |
| JP | 2007313964 A | 12/2007 | |
| JP | 2014213671 A | 11/2014 | |
| JP | 2015519260 A | 7/2015 | |
| JP | 2016120732 A | 7/2016 | |

* cited by examiner

PRIOR ART

PERFORATED MEMBER AND AIR CONDITIONER FOR VEHICLE HAVING SAME

CROSS-REFERENCES TO RELATED APPLICATIONS

This application claims the benefit and priority of Korean Patent Application Serial No. 10-2019-0020004 filed Feb. 20, 2019, and Korean Patent Application Serial No. 10-2018-00119958 filed Oct. 8, 2018. The entire disclosures of each of the above applications are incorporated herein by reference.

BACKGROUND OF THE INVENTION

Field of the Invention

The present invention relates to an air conditioner for a vehicle, and more particularly, to a perforated member, which includes an electric heater, such as a PTC heater, for heating air by electric power, and an air conditioner for a vehicle having the same.

Background Art

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

Especially, a two-layered air conditioner which divides the inside of an air-conditioning case into an upper air passageway and a lower air passageway in order to secure defogging performance and maintain high heating performance during heating has been developed. In order to defrost the window of a vehicle during heating and running in winter, cold outside air with low humidity is effective, but it causes a drop in indoor temperature.

The two-layered air conditioner realizes two-layer flow of indoor air and outdoor air by supplying outdoor air to an upper part of the vehicle and circulating indoor air in a lower part to perform defogging during heating. Therefore, the two-layered air conditioner can effectively defrost using fresh outdoor air with low humidity supplied to the upper part, supply passengers with fresh outdoor air, and maintain high heating performance by supplying warm air to the lower part.

FIG. 1 is a sectional view showing a conventional two-layered air conditioner for a vehicle. Referring to FIG. 1, the conventional two-layered air conditioner 1 for a vehicle includes an air-conditioning case 10. The air-conditioning case 10 includes an air passageway of a predetermined form formed inside the air-conditioning case 10, and the air passageway is divided into an upper air passageway 14b and a lower air passageway 14a by a partition wall 14c. The air-conditioning case 10 includes a plurality of air outflow ports formed at an outlet of the air-conditioning case 10. The air outflow ports have a defrost vent 16, a face vent 17, a front seat floor vent 18, and a rear seat floor vent 19.

The air-conditioning case 10 includes a blower unit 5 disposed at an inlet of the air-conditioning case 10, and an evaporator 2 and a heater core 3 disposed in the air passageway of the air-conditioning case 10 to be spaced apart from each other. The upper air passageway 14b has a first temp door 11 for adjusting an amount of air passing the heater core 3 and an amount of air bypassing the heater core 3, and the lower air passageway 14a has a second temp door 12 for adjusting an amount of air passing the heater core 3 and an amount of air bypassing the heater core 3.

The air outflow ports respectively have a defrost door 13a and a face door 13b for adjusting an amount of air discharged to the defrost vent 16 and the face vent 17. The air outflow ports have a floor door 13c for adjusting an amount of air discharged to the front seat floor vent 18 and a rear seat mode door 13d for adjusting an amount of air discharged to the rear seat floor vent 19. A bypass door 13e for controlling communication between the upper air passageway 14b and the lower air passageway 14a so as to run indoor air of the lower air passageway 14a to the upper air passageway 14b.

In the meantime, the air conditioner for a vehicle may further include an electric heater, such as a positive temperature coefficient (PTC) heater which generates heat by application of electric power to heat air passing the heater, besides the heater core 3 using cooling water of an engine as a heat source. The electric heater includes a heat generating unit having a PTC element, a heat radiating unit for radiating heat by touching the heat generating unit, a terminal unit, and a housing for surrounding and protecting the above components.

The conventional two-layered air conditioner for a vehicle transmits heat emitted from the heater core during cooling since a rear end of the heater core is opened, so it causes heat pick-up to deteriorate cooling performance. Moreover, if a space between the heater core and the electric heater is divided in order to form the two-layered air conditioner, it deteriorates manufacturing performance and assemblability.

SUMMARY OF THE INVENTION

Accordingly, the present invention has been made to solve the above-mentioned problems occurring in the prior arts, and it is an object of the present invention to provide a perforated member and an air conditioner for a vehicle having the same, which can solve the heat pick-up problem of a two-layered structure and enhance manufacturing performance and assemblability even though a space between a heater core and an electric heater is divided.

It is another object of the present invention to provide a perforated member and an air conditioner for a vehicle having the same, which can prevent thermal damage and enhance heating performance by optimizing arrangement of the heat generating unit of the electric heater.

To accomplish the above object, according to the present invention, there is provided an air conditioner for a vehicle, in which the inside of an air-conditioning case is divided into a plurality of air passageways by a separation wall, the air conditioner including: a heating heat exchanger disposed inside the air-conditioning case and exchanging heat with air to heat the interior of the vehicle; a perforated member disposed at a downstream side of the heating heat exchanger and having a plurality of perforated holes through which the air passing the heating heat exchanger passes; and partition walls disposed between the heating heat exchanger and the perforated member to divide the air passageway of the air-conditioning case into a plurality of air passageways, wherein the partition wall is formed integrally with the perforated member.

Moreover, the partition walls are respectively formed on a front surface and a rear surface of the perforated member.

Furthermore, the perforated member is an auxiliary heating heat exchanger or a dummy member.

Additionally, the partition walls are detachably combined with the perforated member.

In addition, the perforated member includes: a first combining groove formed in a side facing the heater core wherein the partition wall is inserted into the first combining groove; and a second combining groove formed in the opposite side wherein the separation wall of the air-conditioning case is inserted into the second combining groove.

Moreover, the partition wall is arranged higher than a central portion of the perforated member in a vertical direction.

Furthermore, the partition wall is arranged at a 2:3 part of the electric heater in the vertical direction, and an interval between the heating heat exchanger and the perforated member is within a range of 2 mm to 20 mm, and more preferably, the interval between the heating heat exchanger and the perforated member is 10 mm.

Additionally, the partition wall is made of a material with more excellent heat resistance than that of the air-conditioning case.

In addition, if the perforated member is an auxiliary heating heat exchanger, the partition wall is formed separately and is assembled to the auxiliary heating heat exchanger, and if the perforated member is a dummy member, the partition wall is injection-molded integrally with the dummy member.

Moreover, the partition wall formed on the front surface of the perforated member is longer than the partition wall formed on the rear surface of the perforated member.

Furthermore, if the perforated member is an auxiliary heating heat exchanger, the partition wall penetrates through the auxiliary heating heat exchanger in an air flow back-and-forth direction and is slidably combined with the auxiliary heating heat exchanger.

Additionally, a bridge unit is disposed between fixing portions of the partition wall and the perforated member. The bridge unit includes: a first support part bent and extended at right angles to the partition wall formed on the front surface of the perforated member and getting in close contact with the front surface of the perforated member; a second support part bent and extended at right angles to the partition wall formed on the rear surface of the perforated member and getting in close contact with the rear surface of the perforated member; and a connection part connecting the first support part and the second support part with each other and inserted and joined into the fixing part of the perforated member.

In addition, indoor air and outdoor air are separately introduced into the air passageway of the air-conditioning case, and the air passageway is divided into an upper air passageway and a lower air passageway by a separation wall.

Moreover, the perforated member is an electric heater, the electric heater includes heat generating units for generating heat by application of electric power and a heat radiating unit exchanging heat with air, and the electric heater is arranged in such a way that the separation wall faces the heat radiating unit.

Furthermore, the heat generating units of the electric heater are arranged to be spaced apart from the separation wall in the vertical direction.

Additionally, the heat generating units of the electric heater are formed in even numbers, and the heat generating units of the electric heater are arranged symmetrically on the basis of the separation wall in the vertical direction.

In addition, the heat generating units of the electric heater are formed in odd numbers, and the heat generating units of the electric heater are arranged much more at a lower part than at an upper part on the basis of the separation wall.

Moreover, the electric heater is mounted in such a way that a central portion is located at the separation wall in the vertical direction.

Furthermore, a heater core for heating air by a cooling water heat source is included in the air-conditioning case, and the electric heater is integrally combined with the downstream side of the heater core in an air flow direction. The heater core includes: a first header tank and a second header tank disposed side by side to be spaced apart from each other; a cooling water pipe disposed on the first header tank or the second header tank for introducing and discharging cooling water; a plurality of tubes of which both ends are fixed to the first header tank and the second header tank to form a cooling water passageway; pins interposed between the tubes; and a pair of side plates for supporting both sides of an assembly of the tubes and the pins, wherein the electric heater includes a terminal unit for applying electric power to the heat generating units, the heat radiating unit is formed in a plate shape to fix the heat generating units, and end portions of the heat generating units and the heat radiating unit are supported by a housing.

In another aspect of the present invention, there is a perforated member disposed in an air conditioner for a vehicle, in which the inside of an air-conditioning case is divided into a plurality of air passageways by a separation wall, the perforated member including: a plurality of perforated holes disposed at a downstream side of a heating heat exchanger, which is disposed inside the air-conditioning case to heat the interior of the vehicle by exchanging heat with air, wherein the air passing the heating heat exchanger passes through the perforated holes; partition walls formed on front and rear surfaces of the heating heat exchanger to divide the air passageway of the air-conditioning case into several air passageways, wherein the partition walls are formed integrally.

According to the present invention, the perforated member and the air conditioner for a vehicle with a two-layered structure can solve the heat pick-up problem, maintain performance of the two-layered air conditioner, enhance manufacturing performance and assemblability. Furthermore, the perforated member is applicable not only to a two-layered air conditioner but also to a general air conditioner.

Additionally, the perforated member and the air conditioner for a vehicle according to the present invention are commonly applicable to an air conditioner having the electric heater and an air conditioner having no electric heater, and optimize heat pick-up performance and heating performance according to circumstances since partition walls can be adjusted in their position.

In addition, the air conditioner for a vehicle can reduce thermal deformation and enhance safety by optimizing arrangement of a heat generating unit of the electric heater to prevent thermal damage, enhance heating performance by increasing heat-exchanging efficiency of the heat generating unit, and increase passenger satisfaction by raising discharge temperature of a foot zone.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structures of a perforated member and an air conditioner for a vehicle having the same according to exemplary embodiments of the present invention will be described with reference to the accompanying drawings.

Figure 1:
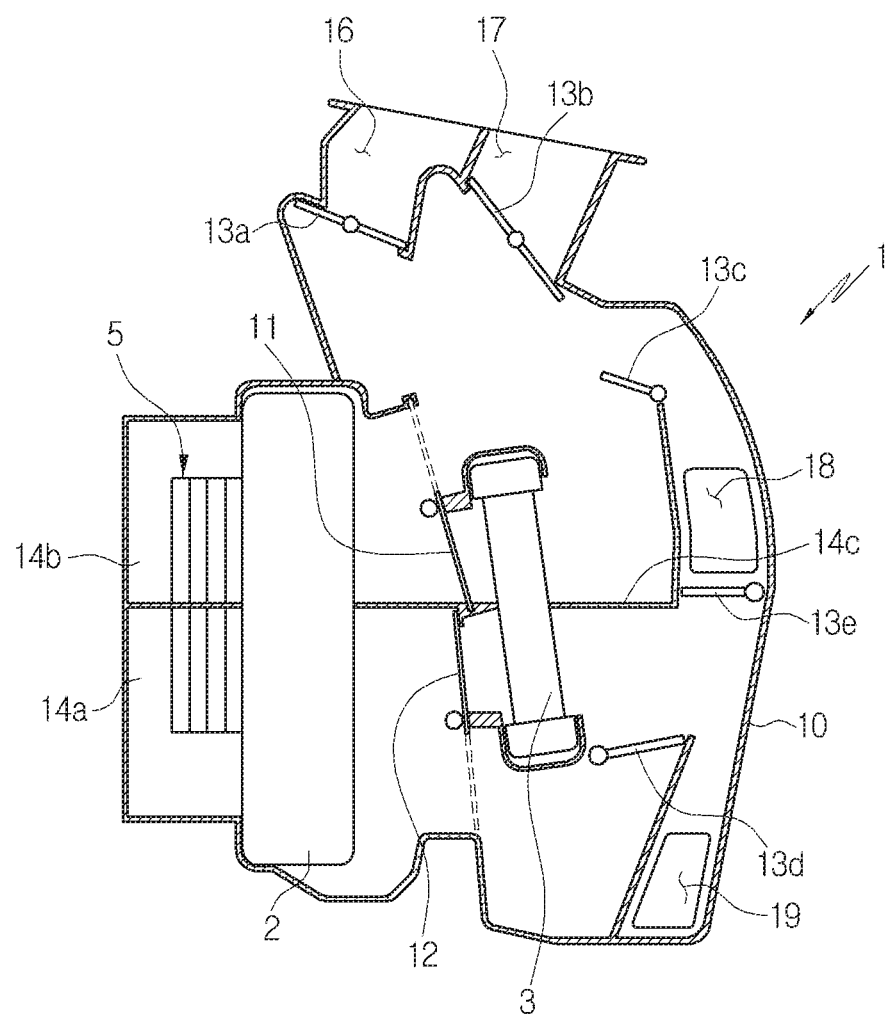
FIG. 1 is a sectional view showing a conventional two-layered air conditioner for a vehicle.
Figure 2:
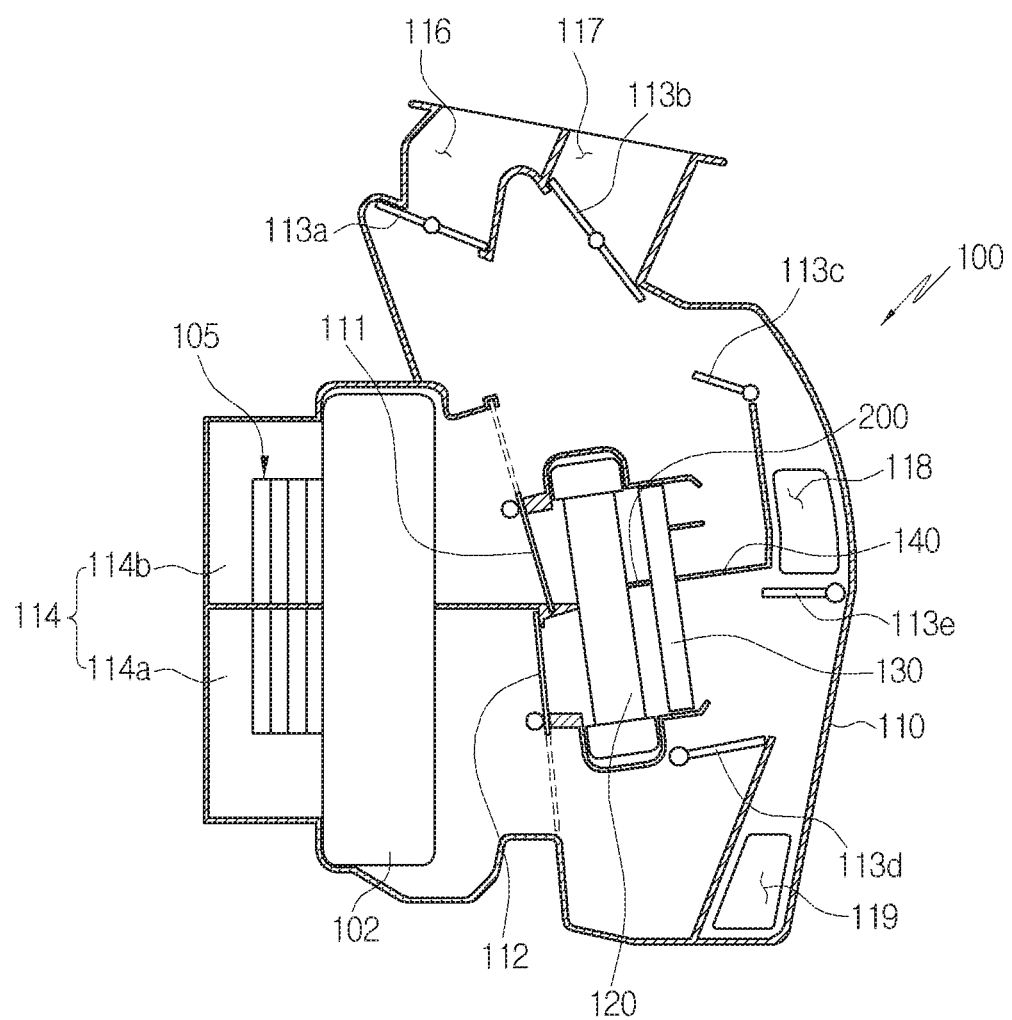
FIG. 2 is a sectional view of an air conditioner for a vehicle according to a first preferred embodiment of the present invention.
Figure 3:
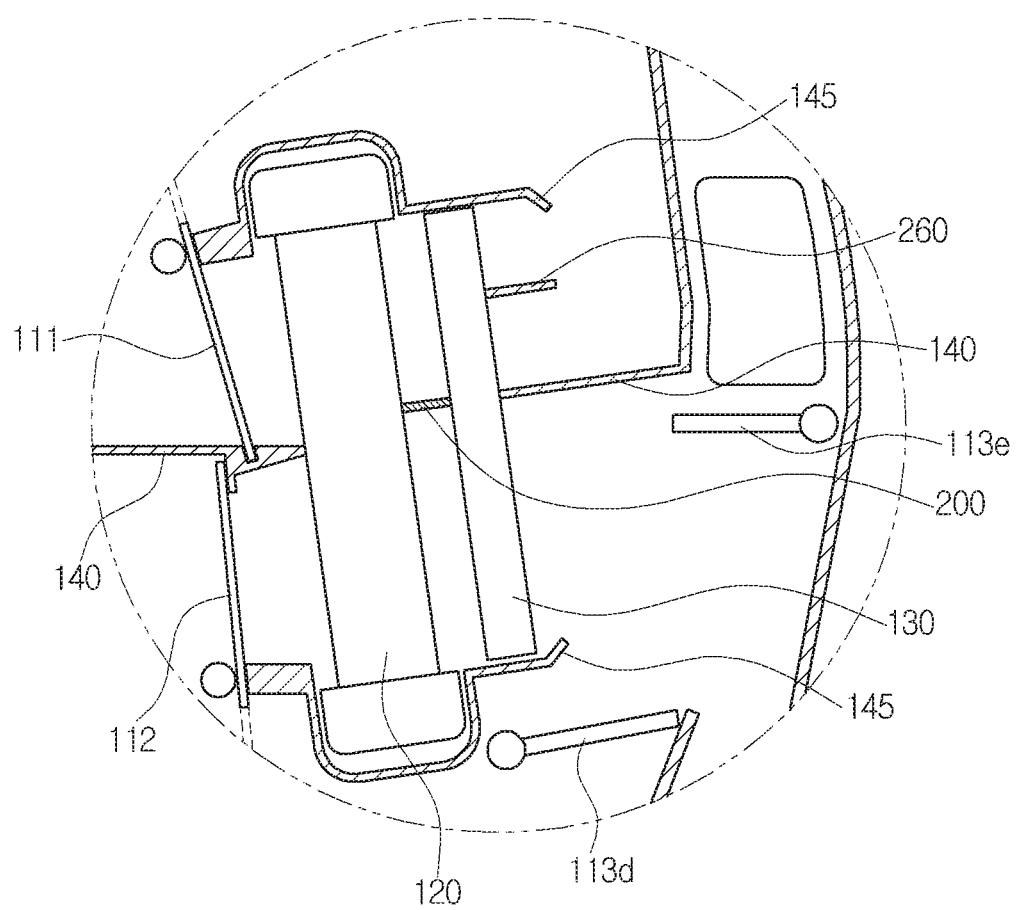
FIG. 3 is an enlarged sectional view of a part of FIG. 2.
Figure 4:
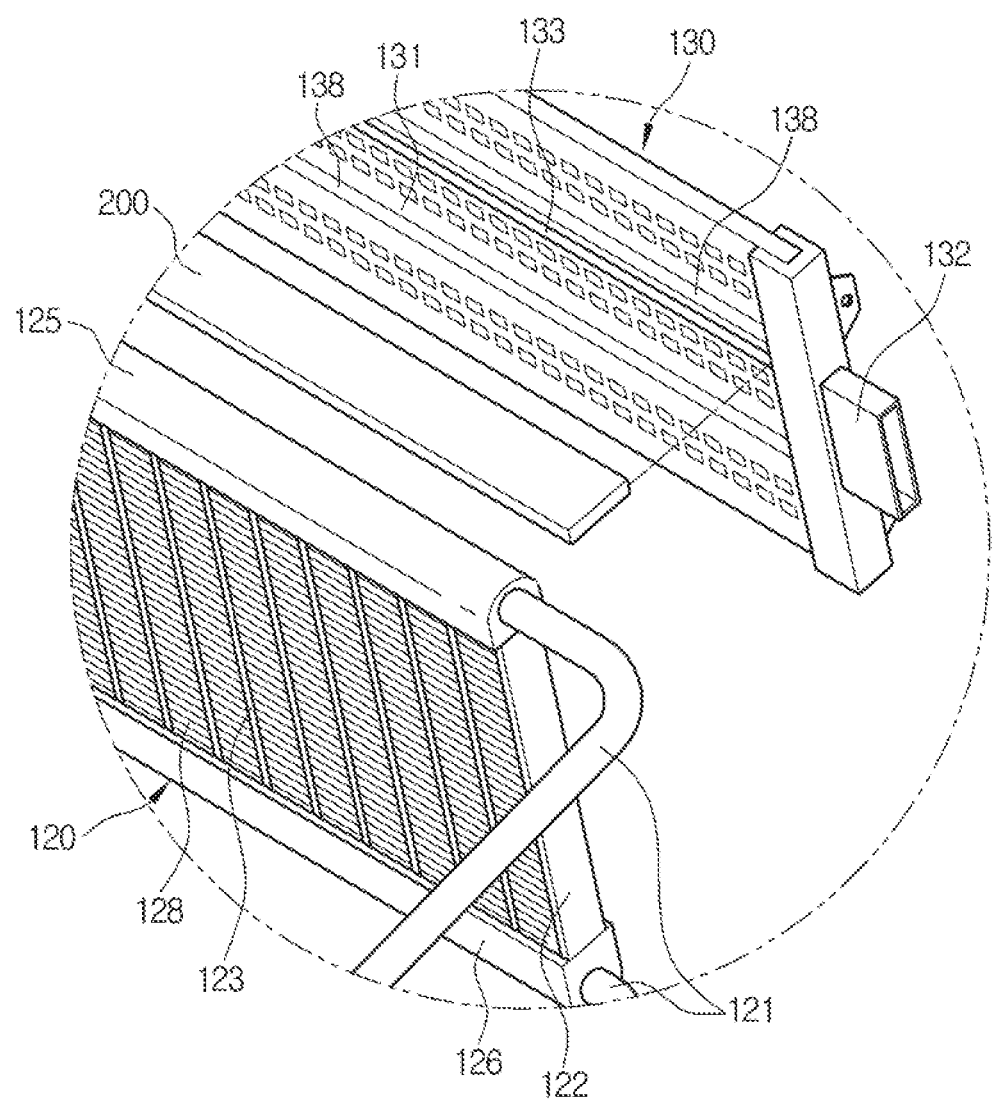
FIG. 4 is an exploded perspective view of a heater core and an electric heater according to the first preferred embodiment of the present invention.
Figure 5:
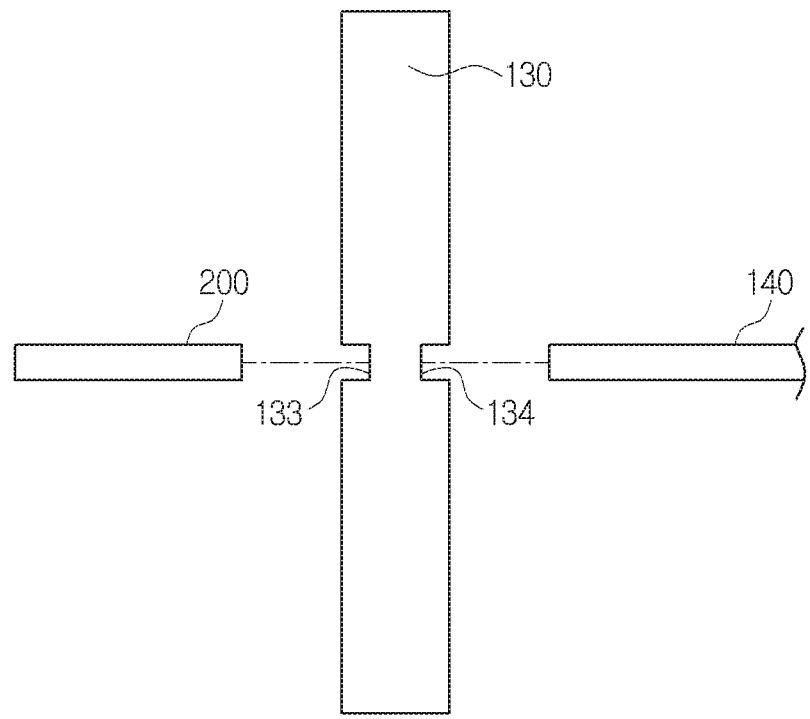
FIG. 5 is a side view showing a separated state of the electric heater and partition walls according to the first preferred embodiment of the present invention.
Figure 6:
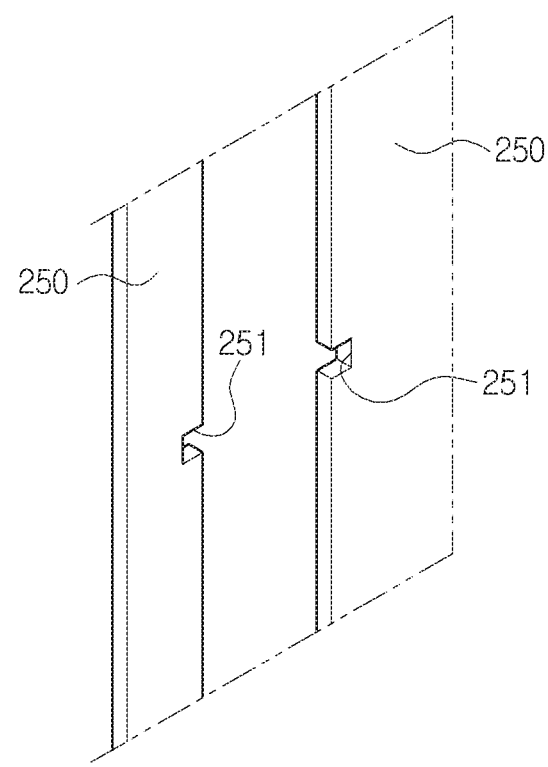
FIG. 6 is a perspective view showing a separator according to the first preferred embodiment of the present invention.
Figure 7:
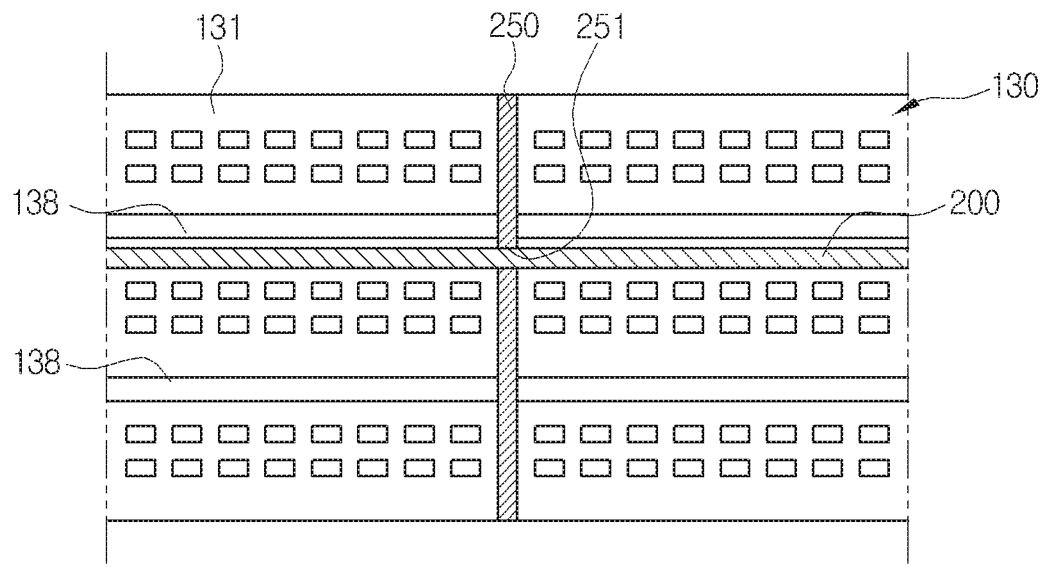
FIG. 7 is a front sectional view showing a state where the electric heater and the partition walls are combined with the separator according to the first preferred embodiment of the present invention.
Figure 8:
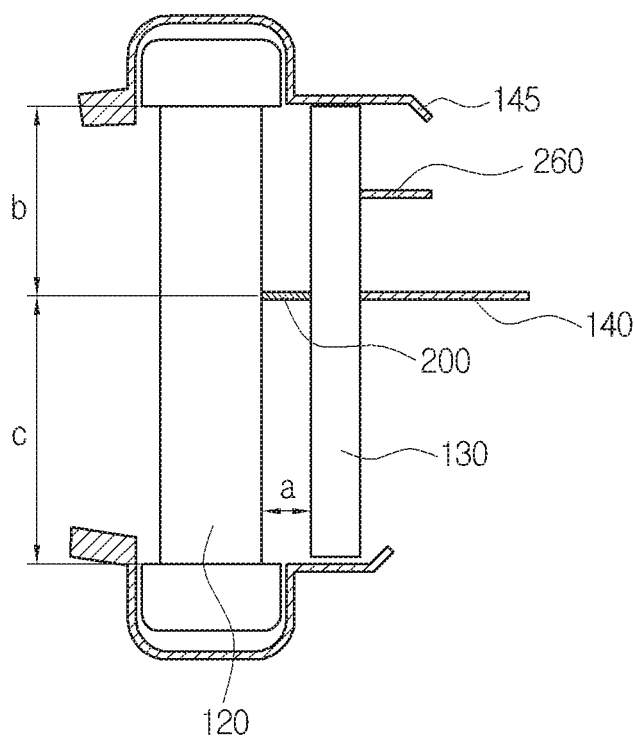
FIG. 8 is a side sectional view showing a combined state of a heater core, the partition walls and the electric heater according to the first preferred embodiment of the present invention.

FIG. 2 is a sectional view of an air conditioner for a vehicle according to a first preferred embodiment of the present invention, FIG. 3 is an enlarged sectional view of a part of FIG. 2, FIG. 4 is an exploded perspective view of a heater core and an electric heater according to the first preferred embodiment of the present invention, FIG. 5 is a side view showing a separated state of the electric heater and a partition wall according to the first preferred embodiment of the present invention, FIG. 6 is a perspective view showing a separator according to the first preferred embodiment of the present invention, FIG. 7 is a front sectional view showing a state where the electric heater and the partition wall are combined with the separator according to the first preferred embodiment of the present invention, and FIG. 8 is a side sectional view showing a combined state of a heater core, the partition wall and the electric heater according to the first preferred embodiment of the present invention.

The right-and-left direction in FIG. 2 is a back-and-forth direction of a vehicle, the vertical direction is a height of the vehicle, and the protruding direction in the drawings is a vehicle width direction.

As shown in FIGS. 2 to 8, the air conditioner 100 for a vehicle according to the first preferred embodiment of the present invention is a two-layered air conditioner which supplies outdoor to an upper part and circulates indoor air in a lower part in order to enhance defogging performance during heating, and includes an air-conditioning case 110.

The air-conditioning case 110 includes an air passageway 114 formed therein, and the air passageway 114 includes an upper air passageway 114b and a lower air passageway 114a partitioned by a separation wall 140. Indoor air is introduced and flown into the lower air passageway 114a, and outdoor air is introduced and flown into the upper air passageway 114b. The indoor air and the outdoor air are separately introduced into the air-conditioning case 110, and the inside of the air-conditioning case 110 is divided into the upper air passageway 114b and the lower air passageway 114a by the separation wall 140.

The lower air passageway 114a is an indoor air passageway in which the indoor air introduced through an indoor air inlet flows, and is located in a lower part among upper and lower spaces divided by the separation wall 140. The upper air passageway 114b is an outdoor air passageway in which the outdoor air introduced through an outdoor air inlet flows, and is located in an upper part among upper and lower spaces divided by the separation wall 140.

The air-conditioning case 110 includes a plurality of air outflow ports formed at an outlet of the air-conditioning case 110. The air outflow ports are a defrost vent 116, a face vent 117, a front seat floor vent 118, and a rear seat floor vent 119.

The air-conditioning case 110 includes a blower unit 105 disposed at an inlet of the air-conditioning case 110. The blower unit 105 is connected to an air inflow port of the air-conditioning case 110. The air inflow port is an inlet of the lower air passageway 114a and the upper air passageway 114b. A plurality of heat exchangers for exchanging heat with air passing through the air passageway of the air-conditioning case 110 are disposed in the air passageway. The heat exchanger includes: a cooling heat exchanger disposed inside the air-conditioning case 110 for cooling the interior of the vehicle through heat-exchange with the air; and a heating heat exchanger for heating the interior of the vehicle. That is, an evaporator 102 which is the cooling heat exchanger and a heater core 120 which is a heating heat exchanger are disposed inside the air-conditioning case 110 to be spaced apart from each other at a predetermined interval from the air passageway 114.

The air passageway of the air-conditioning case 110 is divided into the upper air passageway 114b and the lower air passageway 114a to the downstream side of the evaporator 102 by the separation wall 140. The outdoor air introduced to the upper air passageway 114b exchanges heat with the heat exchanger, and then, is discharged to at least one among the defrost vent 116, the face vent 117, and the front seat floor vent 118. The indoor air introduced into the lower air passageway 114a exchanges heat with the heat exchanger, and then, may be discharged to the rear seat floor vent 119 or may flow to the upper air passageway 114b and be discharged to the front seat of the vehicle.

The first temp door 111 which adjusts the amount of the air passing the heater core 120 and the amount of the air bypassing the heater core 120 is disposed in the upper air passageway 114b, and the second temp door 112 which adjusts the amount of the air passing the heater core 120 and the amount of the air bypassing the heater core 120 is disposed in the lower air passageway 114a.

The defrost door 113a and the face door 113b for respectively adjusting the amount of the air toward the defrost vent 116 and the face vent 117 are disposed in the air outflow ports of the air-conditioning case 110. Moreover, the floor door 113c for adjusting the amount of the air toward the front seat floor vent 118 and the rear seat mode door 113d for adjusting the amount of the air toward the rear seat floor vent 119 are also disposed in the air outflow ports of the air-conditioning case 110. Furthermore, the bypass door 113e for adjusting the degree of opening of a communication passageway between the upper air passageway 114b and the lower air passageway 114a is provided, so that the indoor air of the lower air passageway 114a can flow to the upper air passageway 114b.

The air conditioner 100 for a vehicle includes a perforated member. The perforated member may be an auxiliary heating heat exchanger or a dummy member. That is, the perforated member may be the electric heater 130, which is the auxiliary heating heat exchanger, or the dummy member, which is made of synthetic resin, if there is no electric heater. The perforated member may be selectively used to an air conditioner which has the electric heater and an air conditioner which has no electric heater, so that the air-conditioning case may be in common use. In this embodiment, the perforated member is the electric heater 130.

The electric heater 130 is disposed at the downstream side of the heater core 120 in the air passageway inside the air-conditioning case 110, and generates heat by application of electric power to heat air. The electric heater 130 may be a positive temperature coefficient (PTC) heater. The electric heater 130 includes a terminal unit 132, heat generating units 138, a heat radiating unit 131, and a housing.

The terminal unit 132 is to receive electric power. The plurality of heat generating units 138 are arranged in a vertical direction to be spaced apart from each other and generate heat by electric power applied to the terminal unit 132. The heat generating units 138 include electrodes and heat generating tubes using PTC elements. The heat radiating unit 131 is formed in a plate shape, fixes the heat generating units 138, and exchanges heat generated from the heat generating unit 138 with air passing the heat radiating unit 131. The housing supports end portions of the heat radiating unit 131 and the heat generating units 138.

The heater core 120 is included in the air-conditioning case 110, and heats air by a cooling water heat source. The heater core 120 includes a first header tank 125, a second header tank 126, a cooling water pipe 121, tubes 123, and pins 128. The first header tank 125 and the second header tank 126 are arranged side by side to be spaced apart from each other at a predetermined interval in the vertical direction. Both ends of the tube 123 are fixed at the first header tank 125 and the second header tank 126 to form a cooling water passageway, and a plurality of the tubes are disposed side by side in the width direction. The pins 128 are interposed between the plural tubes 123.

The electric heater 130 is formed to be spaced apart from the heater core 120 at a predetermined interval. The electric heater 130 does not receive heat emitted from the heater core 120. The electric heater 130 spaced apart from the heater core 120 can reduce an influence of the heat, which is emitted from the heater core 120 and passes through the lower air passageway, during cooling so as to enhance heat pick-up performance.

A partition wall 200 is disposed between the heater core 120 and the electric heater 130. The partition wall 200 divides the air passageway of the air-conditioning case 110 into the upper air passageway 114b and the lower air passageway 114a. In more detail, the partition wall 200 divides the air passageway between the heater core 120 and the electric heater 130 in the air-conditioning case 110 into the upper air passageway 114b and the lower air passageway 114a.

If the heater core 120 and the electric heater 130 are separated from each other, there is a space between the heater core 120 and the electric heater 130, and the upper air passageway and the lower air passageway are mixed in the space. Therefore, it reduces the effect of the two-layered air conditioner. The partition wall 200 securely divides the space between the heater core 120 and the electric heater 130 into the upper and lower parts, so that the air conditioner can sufficiently maintain the effect of the two-layered air conditioner as it is.

Finally, the present invention can enhance heat pick-up performance by reducing the influence of the heat, which is emitted from the heater core 120 and passes through the lower air passageway, during cooling, and sufficiently maintain the effect of the two-layered air conditioner by securely dividing the space between the heater core 120 and the electric heater 130 into the upper and lower parts.

The partition wall 200 is combined with the electric heater 130. That is, the partition wall 200 does not integrally extend to the inside of the air-conditioning case 110 or is not combined with the air-conditioning case 110. The partition wall 200 is separately formed from the air-conditioning case 110, is made of a material different from that of the air-conditioning case 110, and then, is integrally or detachably combined with the electric heater 130. Preferably, the partition wall 200 is detachably combined with the electric heater 130.

As described above, because the partition wall 200 is combined with the electric heater 130, a mold of the air-conditioning case becomes simple to enhance manufacturing performance, differently from the structure that the partition wall is integrally formed in the air-conditioning case or is combined with the air-conditioning case. Moreover, because the electric heater 130 is assembled to the air-conditioning case 110 in the state where the partition wall 200 is combined with the electric heater 130, it enhances assemblability.

Furthermore, the partition wall 200 may be used in combination with the electric heater 130 in a two-layered air conditioner, and may be used in separation from the electric heater 130 in a single-layered air conditioner. That is, because the partition wall 200 is detachably combined with the electric heater 130, it is commonly applicable not only to the two-layered air conditioner but also to the single-layered air conditioner.

The partition wall 200 is made of a material with more excellent heat resistance than that of the air-conditioning case 110. The partition wall 200 may be made of polypropylene. Therefore, the partition wall 200 can enhance performance of the two-layered air conditioner by reducing heat exchange between the upper air passageway and the lower air passageway.

The electric heater 130 includes a first combining groove 133 formed in a side facing the heater core 120 and a second combining groove 134 formed in the opposite side. The partition wall 200 is inserted into the first combining groove 133, and the separation wall 140 of the air-conditioning case 110 is inserted into the second combining groove 134. The first combining groove 133 is formed in an approximately central portion of the electric heater 130 in the vertical direction, and is elongated in the vehicle width direction. The partition wall 200 can be detachably combined with the electric heater 130 by the first combining groove 133.

Referring to FIG. 8, preferably, the partition wall 200 is arranged higher than the central portion of the electric heater 130. Because the partition wall 200 is arranged higher than the central portion of the electric heater 130, it helps wind distribution of the upper air passageway and the lower air passageway, and sends more wind to the lower air passageway during heating in order to enhance heating performance.

More preferably, the partition wall 200 is arranged at a 2:3 part of the electric heater 130 in the vertical direction. That is, a ratio of a height (b) of an upper end of the electric heater from the partition wall and a height (c) of a lower end of the electric heater from the partition wall is 2:3. As a result of several tests, it was confirmed that wind distribution and heating performance were optimized at the 2:3 part of the electric heater 130.

Referring to FIGS. 6 and 7, the air-conditioning case 110 includes a separator 250. The separator 250 is combined with the central portion of the air-conditioning case 110 in the vehicle width direction, and divides the air passageway of the air-conditioning case 110 in the vehicle width direction into right and left parts so as to independently do air-conditioning of the driver's seat and the passenger's seat. The separator 250 includes a guide slot 251 for inserting the partition wall 200 thereinto.

The separator 250 supports the central portion of the partition wall 200 in the vehicle width direction by the guide slot 251 of the separator 250, so that the partition wall 200 can be stably fixed inside the air-conditioning case 110.

Additionally, when the partition wall 200 and the electric heater 130 are assembled to the air-conditioning case 110, the guide slot 251 serves to guide assembly.

The heater core 120 is assembled to a seating part 145 inside the air-conditioning case 110, and the seating part 145 is extended toward the rear so that the electric heater 130 is seated and assembled. The entire air passing the heater core 120 passes the electric heater 130. A rib 260 may be separately formed at a rear end of the electric heater 130 in the upper air passageway. The rib 260 enhances mixing property of the air passing the heater core 120 and the electric heater 130, and also enhances air-conditioning performance by enhancing wind distribution.

In addition, an interval (a) between the heater core 120 and the electric heater 130 is within a range of 2 mm to 20 mm. Preferably, the interval (a) between the heater core 120 and the electric heater 130 is 10 mm.

If the interval (a) is shorter than 2 mm, because the heater core 120 and the electric heater 130 seem to be nearly attached to each other, as described above, it causes the heat pick-up problem that heat generated from the heater core during cooling is transferred to the rear and cooling performance is deteriorated. Moreover, if the interval (a) is longer than 2 mm, because the heater core 120 and the electric heater 130 become far apart from each other, heating performance is deteriorated. As a result of several tests, it was confirmed that heat pick-up performance and heating performance were optimized at the interval (a) of 10 mm.

Figure 9:
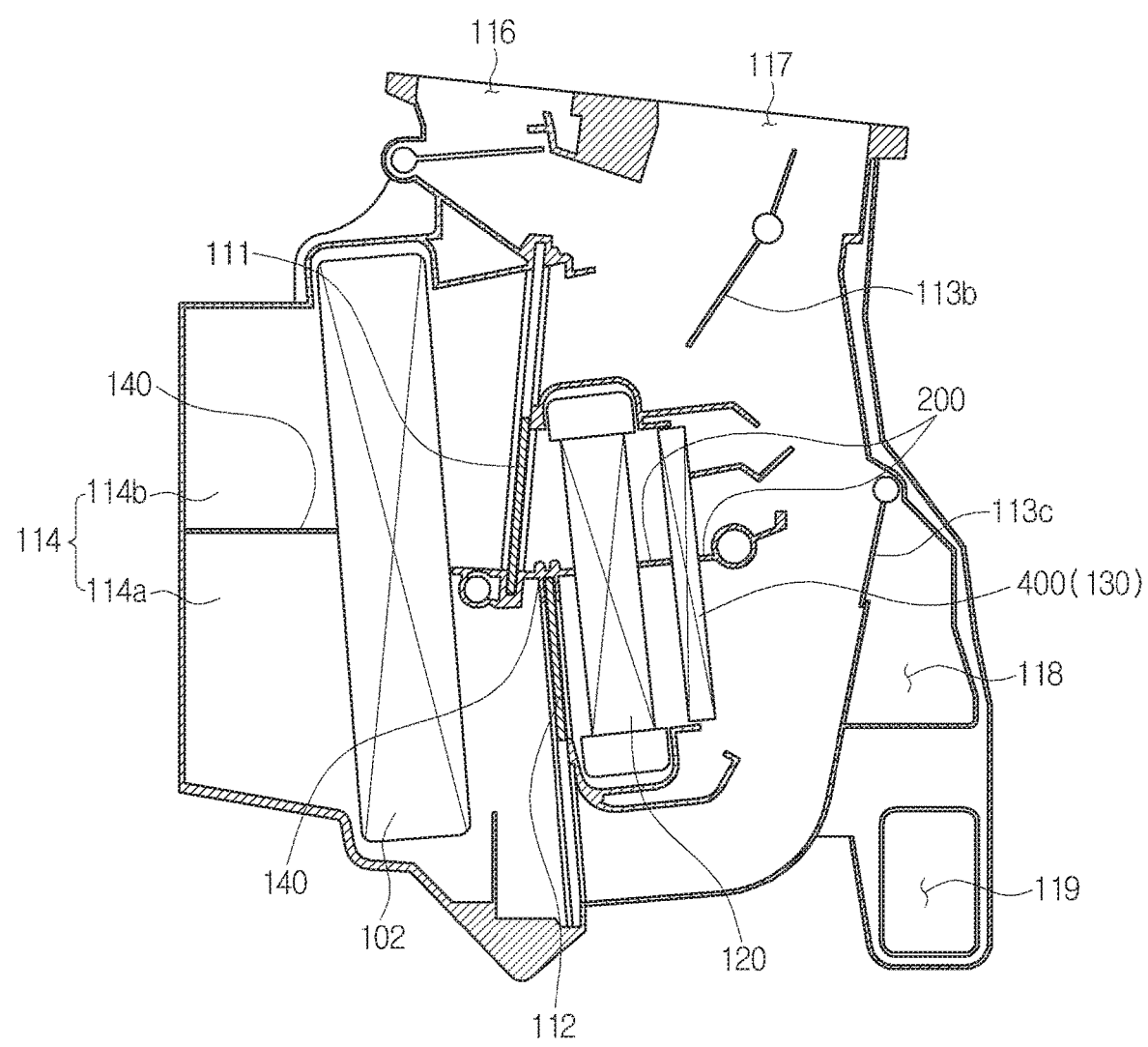
FIG. 9 is a sectional view of an air conditioner for a vehicle according to a second preferred embodiment of the present invention.
Figure 10:
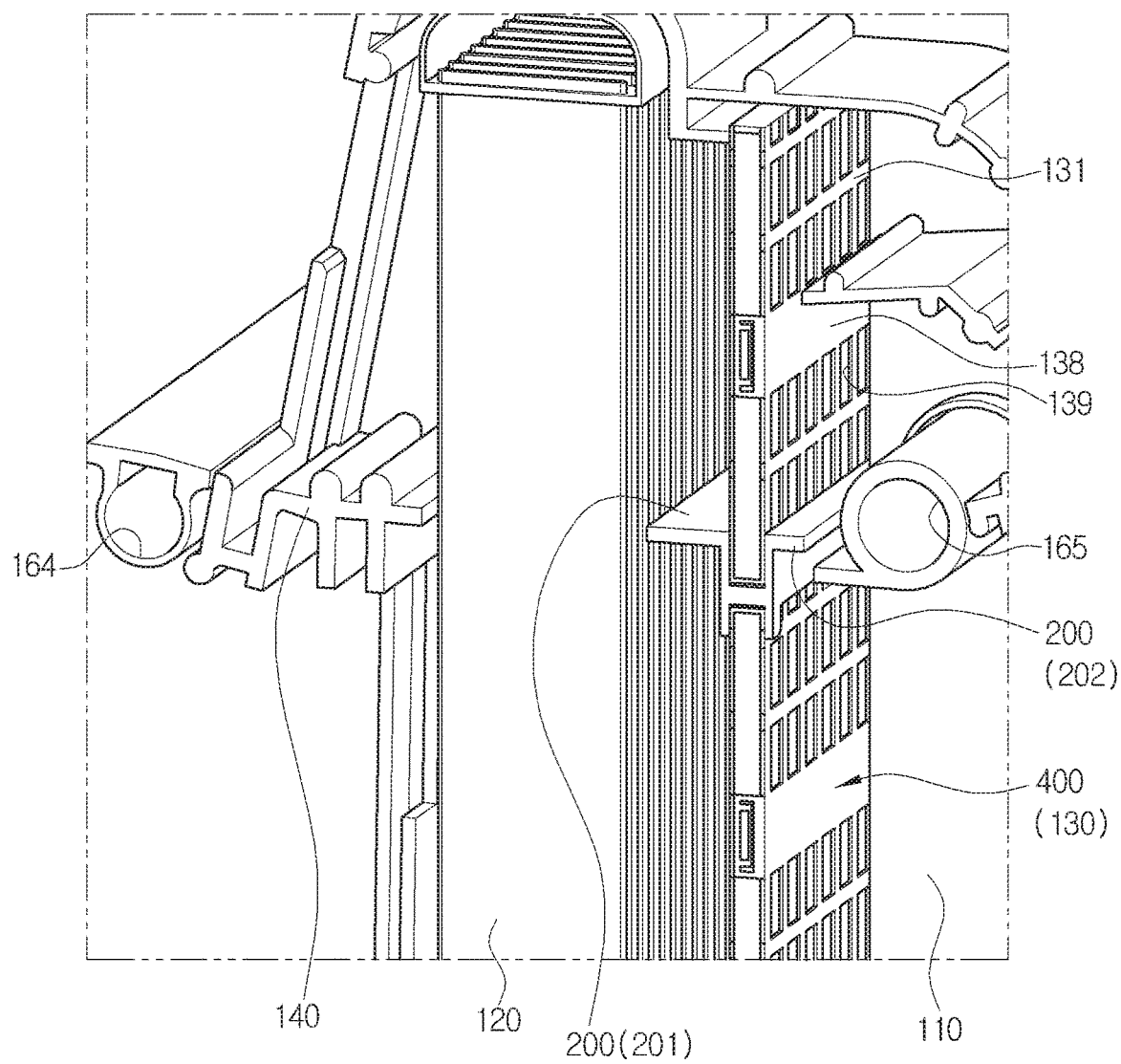
FIG. 10 is a sectional view showing a part of the inside of the air conditioner for a vehicle according to the second preferred embodiment of the present invention.
Figure 11:
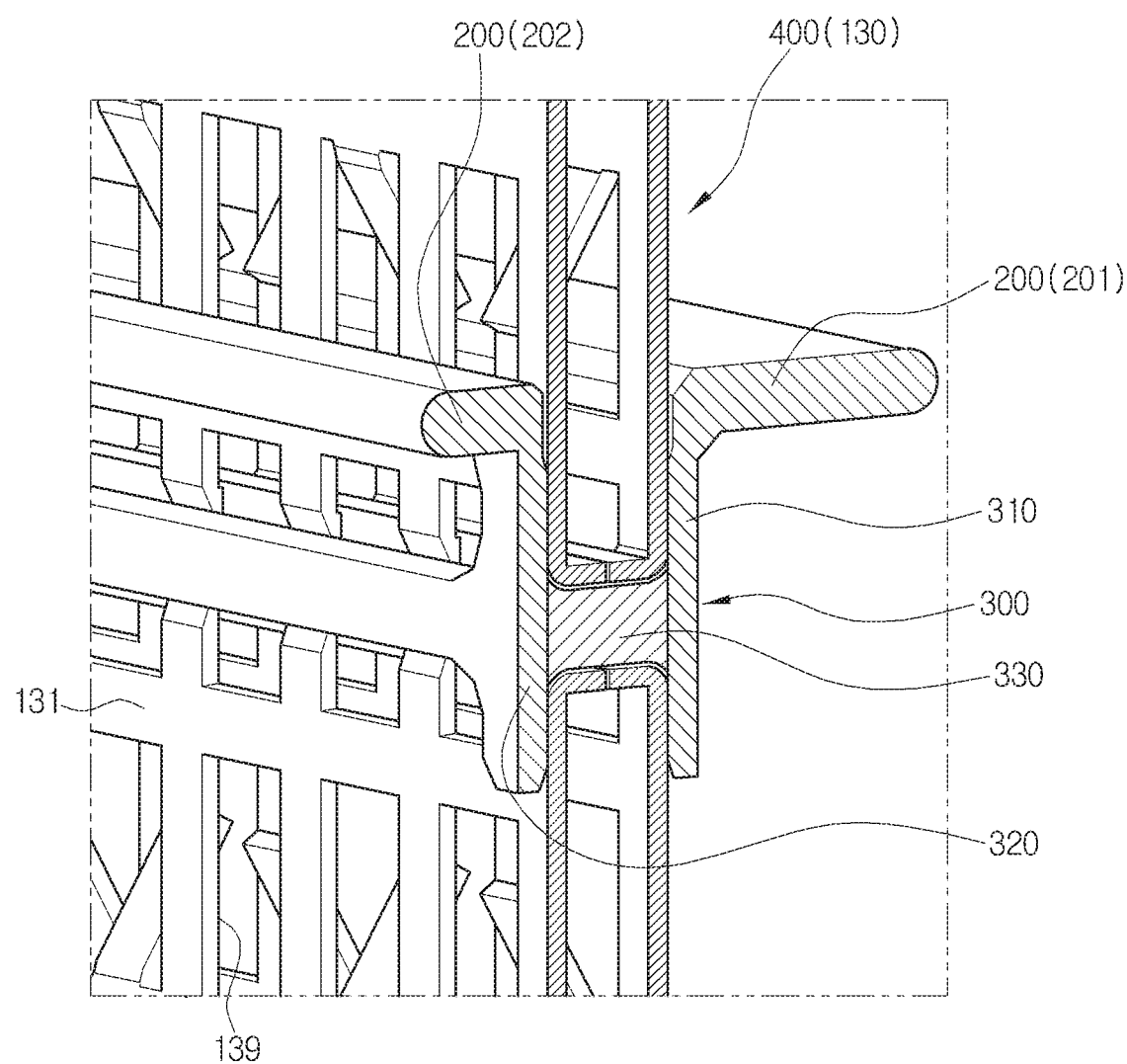
FIG. 11 is a perspective view, in section, showing an electric heater, partition walls and a bridge unit according to the second preferred embodiment of the present invention.
Figure 12:
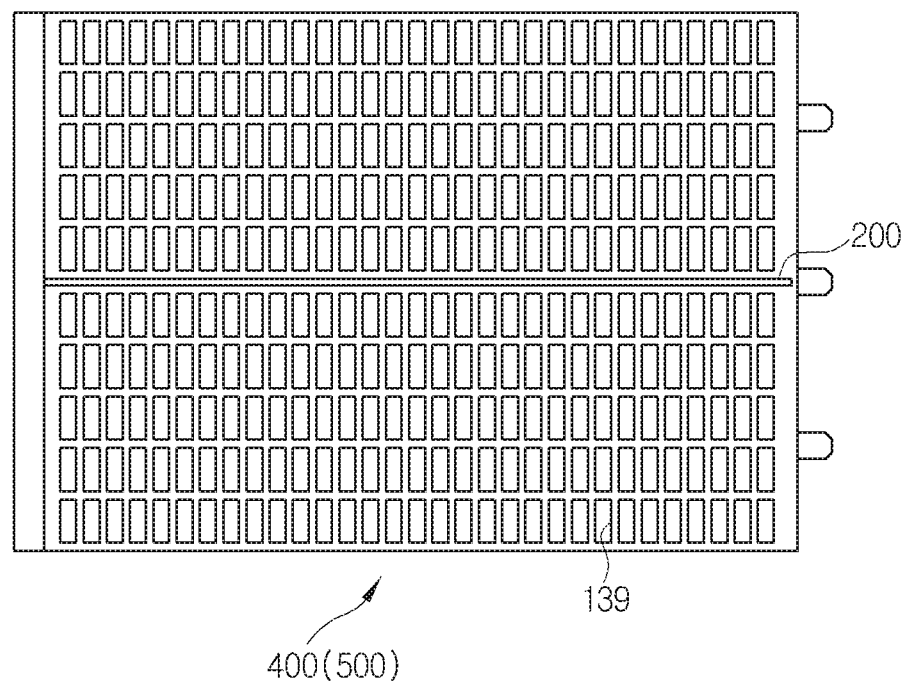
FIG. 12 is a view showing that a perforated member of the air conditioner according to the second preferred embodiment of the present invention is a dummy member.

FIG. 9 is a sectional view of an air conditioner for a vehicle according to a second preferred embodiment of the present invention, FIG. 10 is a sectional view showing a part of the inside of the air conditioner for a vehicle according to the second preferred embodiment of the present invention, FIG. 11 is a perspective view, in section, showing an electric heater, a partition wall and a bridge unit according to the second preferred embodiment of the present invention, and FIG. 12 is a view showing that a perforated member of the air conditioner according to the second preferred embodiment of the present invention is a dummy member.

The air conditioner for a vehicle according to the second preferred embodiment of the present invention includes partition walls 200 respectively formed on the front surface and the rear surface of a perforated member 400. The perforated member 400 may be an electric heater 130, which is an auxiliary heating heat exchanger as shown in FIGS. 9 to 11. Alternatively, the perforated member 400 may be a dummy member 500 as shown in FIG. 12.

If the perforated member 400 is the dummy member 500, air passing perforated holes 139 pass the perforated holes 139 of the dummy member 500 without heat exchange. In this instance, the dummy member 500 performs no function, and is combined with the air-conditioning case 110 to be used commonly not only in an air conditioner having the electric heater but also in an air conditioner having no electric heater.

As shown in FIGS. 9 to 11, the perforated member 400 includes the electric heater 130. When the perforated member 400 includes the electric heater 130, it has perforated holes 139 through which air passes. As shown in FIG. 12, even when the perforated member 400 includes the dummy member 500, it has the perforated holes 139 through which air passes.

That is, the perforated member 400 is included in the air conditioner for a vehicle, in which the inside of the air-conditioning case 110 is divided into a plurality of air passageway by a separation wall 140. The perforated member 400 is disposed inside the air-conditioning case 110, is mounted at the downstream side of the heater core 120, and includes a plurality of the perforated holes 139 through which the air passing the heater core 120 passes.

If the perforated member 400 is the auxiliary heating heat exchanger, namely, the electric heater 130, a partition wall 200 is formed separately and is assembled to the auxiliary heating heat exchanger. If the perforated member 400 is the dummy member 500, the partition wall 200 is injection-molded to be integrated with the dummy member.

Furthermore, a partition wall 201 formed on the front surface of the electric heater 130 is formed to be longer than a partition wall 202 formed on the rear surface of the electric heater 130. If the perforated member 400 is the auxiliary heating heat exchanger (the electric heater 130), the partition wall 200 penetrates through the auxiliary heating heat exchanger (electric heater) in an air flow back-and-forth direction and is slidably combined with the auxiliary heating heat exchanger.

A bridge unit 300 is disposed between fixing portions of the partition wall 200 and the electric heater 130. The bridge unit 300 includes a first support part 310, a second support part 320, and a connection part 330. The first support part 310 is bent and extended at right angles to the partition wall formed on the front surface of the electric heater 130.

The first support part 310 gets in close contact with the front surface of the electric heater 130. The second support part 320 is bent and extended at right angles to the partition wall formed on the rear surface of the electric heater 130. The second support part 320 gets in close contact with the rear surface of the perforated member. The connection part 330 connects the first support part 310 and the second support part 320 with each other, and is inserted and joined into the fixing part of the electric heater 130.

Figure 13:
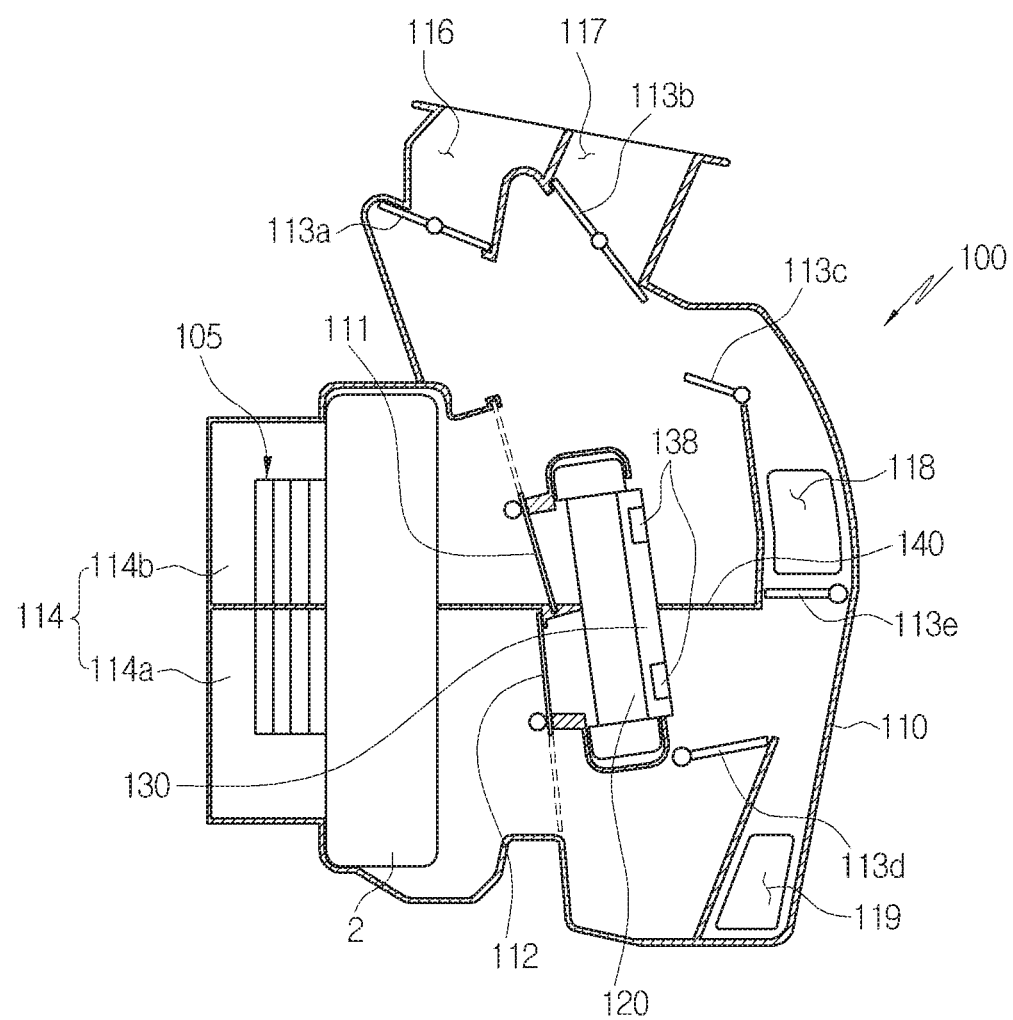
FIG. 13 is a sectional view of an air conditioner for a vehicle according to a third preferred embodiment of the present invention.
Figure 14:
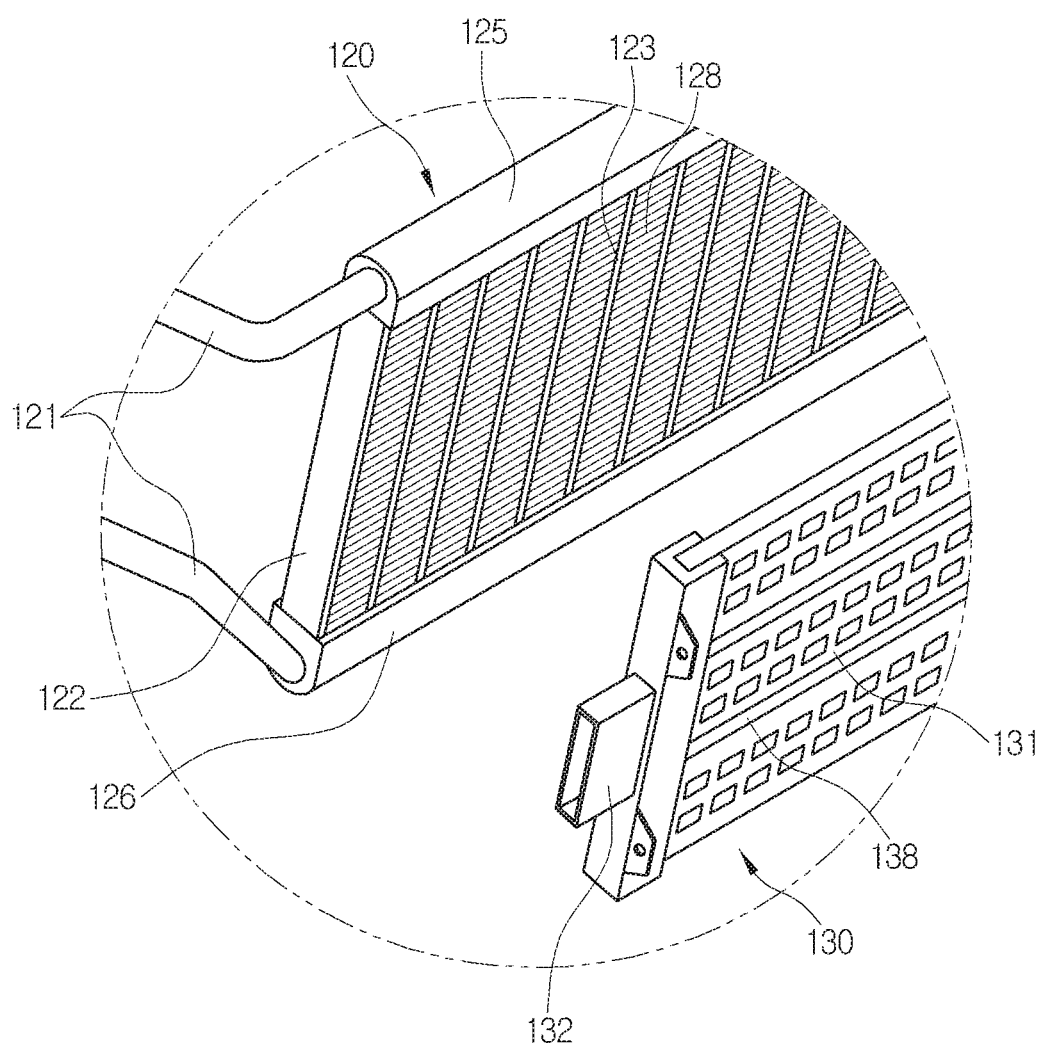
FIG. 14 is an exploded perspective view of a heater core and an electric heater according to the third preferred embodiment of the present invention.
Figure 15:
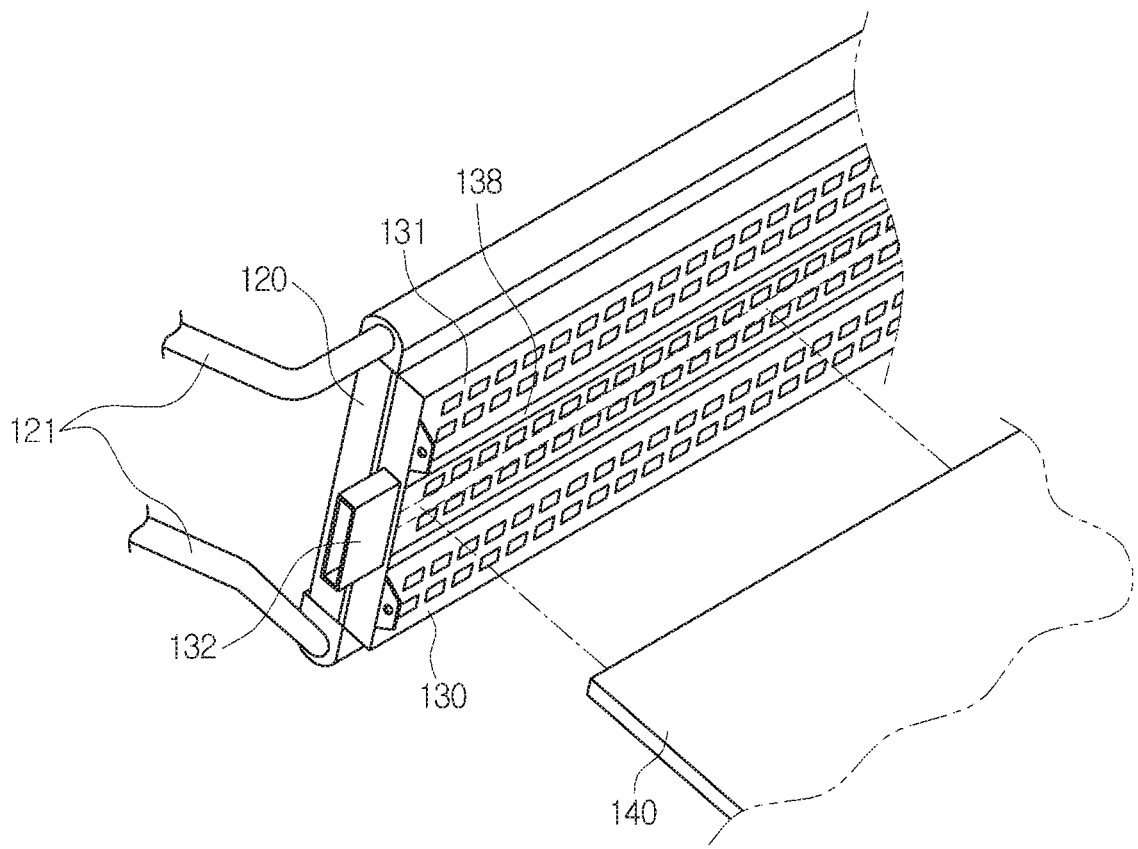
FIG. 15 is a perspective view showing a state where an assembly of the heater core and the electric heater according to the third preferred embodiment of the present invention is separated from a separation wall.
Figure 16:
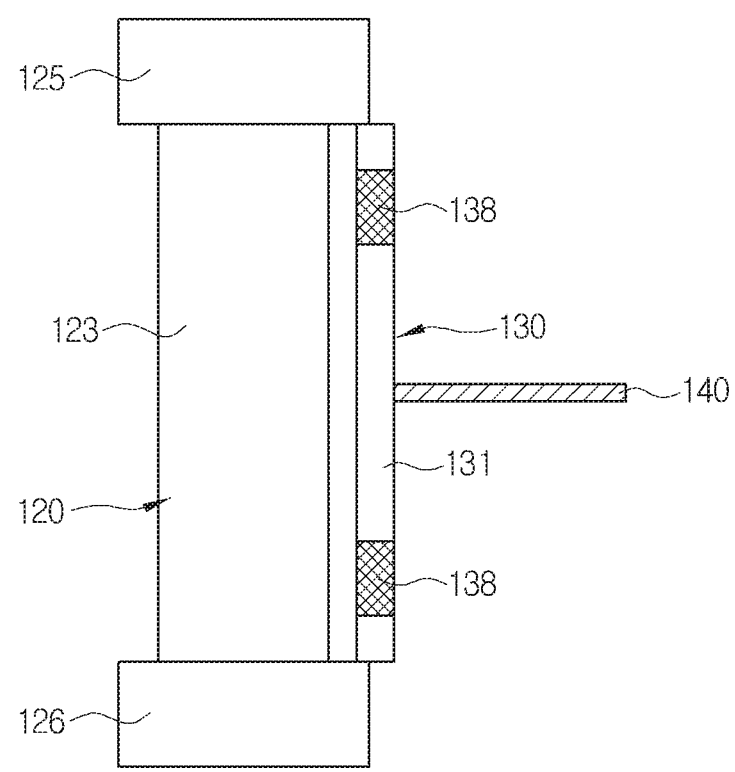
FIG. 16 is a sectional view showing a state where the electric heater and the separation wall according to the third preferred embodiment of the present invention are mounted.

FIG. 13 is a sectional view of an air conditioner for a vehicle according to a third preferred embodiment of the present invention, FIG. 14 is an exploded perspective view of a heater core and an electric heater according to the third preferred embodiment of the present invention, FIG. 15 is a perspective view showing a state where an assembly of the heater core and the electric heater according to the third preferred embodiment of the present invention is separated from a partition wall, and FIG. 16 is a sectional view showing a state where the electric heater and the partition wall according to the third preferred embodiment of the present invention are mounted.

The air-conditioning case 110 includes an evaporator 102, which is a cooling heat exchanger, and a heater core 120, which is a heating heat exchanger, wherein the evaporator 102 and the heater core 120 are disposed inside the air-conditioning case 110 to be spaced apart from each other at a predetermined interval from an air inflow port 114. The air conditioner 100 for a vehicle includes an electric heater 130. The electric heater 130 is disposed inside the air-conditioning case 110, and generates heat by application of electric power in order to heat air. The electric heater 130 may be a positive temperature coefficient (PTC) heater. The electric heater 130 includes a terminal unit 132, heat generating units 138, a heat radiating unit 131, and a housing.

The terminal unit 132 is to receive electric power. The plurality of heat generating units 138 are arranged in a vertical direction to be spaced apart from each other and generate heat by electric power applied to the terminal unit 132. The heat generating units 138 include electrodes and heat generating tubes using PTC elements. The heat radiating unit 131 is formed in a plate shape, fixes the heat generating units 138, and exchanges heat generated from the heat generating unit 138 with air passing the heat radiating unit 131. The housing supports end portions of the heat radiating unit 131 and the heat generating units 138.

The heater core 120 is included in the air-conditioning case 110, and heats air by a cooling water heat source. The heater core 120 includes a first header tank 125, a second header tank 126, a cooling water pipe 121, tubes 123, pins 128, and side plates 122.

The first header tank 125 and the second header tank 126 are arranged side by side to be spaced apart from each other at a predetermined interval in the vertical direction. One among the first header tank 125 and the second header tank 126 includes a cooling water pipe 121 for introducing cooling water, and the other one includes a cooling water pipe 121 for discharging the cooling water.

Both ends of the tube 123 are fixed at the first header tank 125 and the second header tank 126 to form a cooling water passageway, and a plurality of the tubes are disposed side by side in the width direction. The pins 128 are interposed between the plural tubes 123 and exchanges heat with the air passing the pins 128 to enhance heat exchanging performance. There are a pair of the side plates 122 to support both sides of an assembly of the tubes 123 and the pins 128.

The electric heater 130 is integrally combined with the downstream side of the heater core 120 in the air flow direction. That is, both ends of the heat radiating unit 131 of the electric heater are slidably inserted and joined into the first and second header tanks 125 and 126 so as to a combo PTC type heat exchanger assembly that the heater core 120 and the electric heater 130 face each other and get in contact with each other.

Therefore, the entire air passing the heater core 120 exchanges heat while passing the electric heater 130 so as to increase thermal efficiency, and the number of assembly processes is reduced since one heat exchanger assembly is combined with the air-conditioning case. In this embodiment, the combo PTC type heating heat exchanger is applied, but a structure that the heater core and the electric heater are separated or a structure having only the electric heater is also available.

The electric heater 130 is mounted in such a way that a central portion is located at the separation wall 140 in the vertical direction. That is, the electric heater 130 is mounted over the upper air passageway 114b and the lower air passageway 114a, and the separation wall 140 is located at the central portion of the electric heater 130 in the vertical direction. Therefore, each air passageway can uniformly use the electric heater 130 as a heat source.

The electric heater 130 is arranged in such a way that the separation wall 140 faces the heat radiating unit 131. That is, the heat generating units 138 of the electric heater 130 are arranged to be spaced apart from the separation wall 140 in the vertical direction. As described above, because the separation wall 140 of the air-conditioning case 110 faces the heat radiating unit 131 of the electric heater 130 and is spaced apart from the heat generating units 138, it can prevent thermal damage of the separation wall 140 by the heat generating units 138 of high temperature and increase heat exchanging efficiency of the heat generating units 138 to enhance heating performance.

As the first structure for separating the heat generating units 138 from the separation wall 140 in the vertical direction, the heat generating units 138 of the electric heater 130 are formed in even numbers. In this instance, the heat generating units 138 of the electric heater 130 are arranged symmetrically in the vertical direction on the basis of the separation wall 140.

For uniform arrangement of vertical temperature, if the heat generating units 138 are formed in odd numbers, and if the heat generating units 138 are formed symmetrically in the vertical direction, in order to satisfy all of the two cases, the separation wall 140 is inevitably located at the central portion of the electric heater 130 in the vertical direction. So, the heat generating units 138 located at the central portion in the vertical direction come into contact with the separation wall 140.

Therefore, if the heat generating units 138 are formed in even numbers like this embodiment, the heat generating units 138 do not in direct contact with the separation wall 140 and can be formed symmetrically in the vertical direction so as to achieve the uniform arrangement of vertical temperature.

Figure 17:
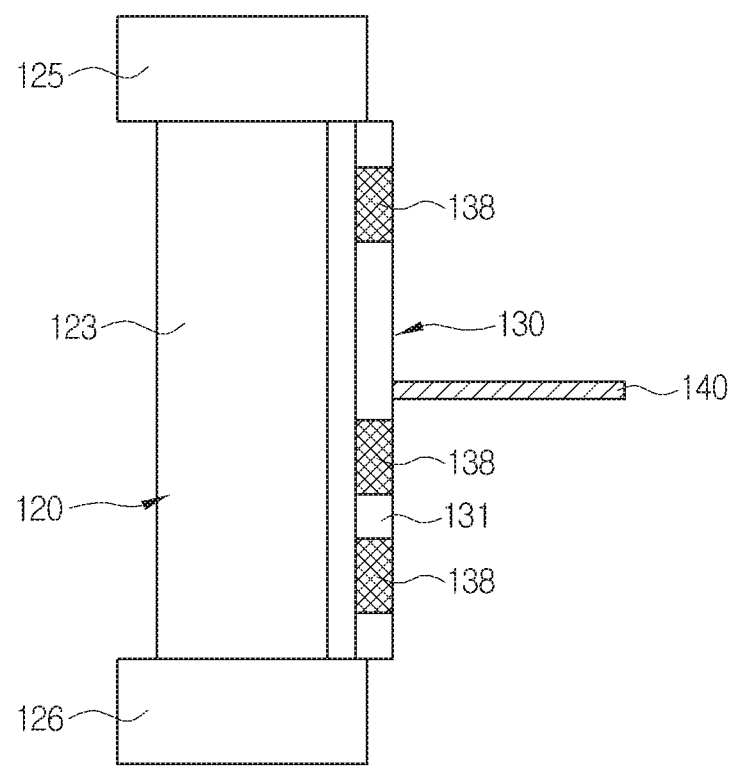
FIGS. 17 to 19 are sectional views showing a mounted state of the electric heater and the separation wall according to a modification of FIG. 16.
Figure 18:
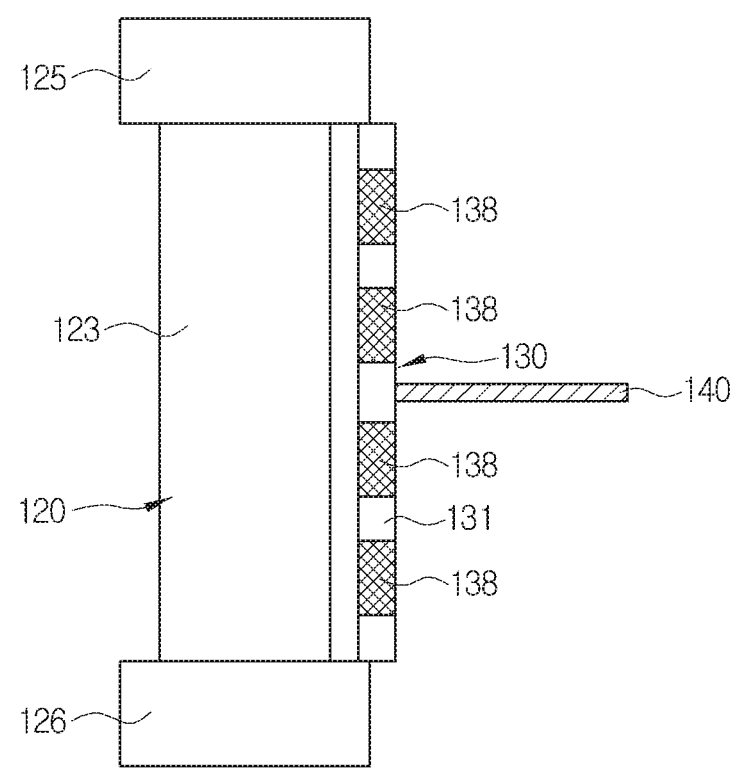
Figure 19:
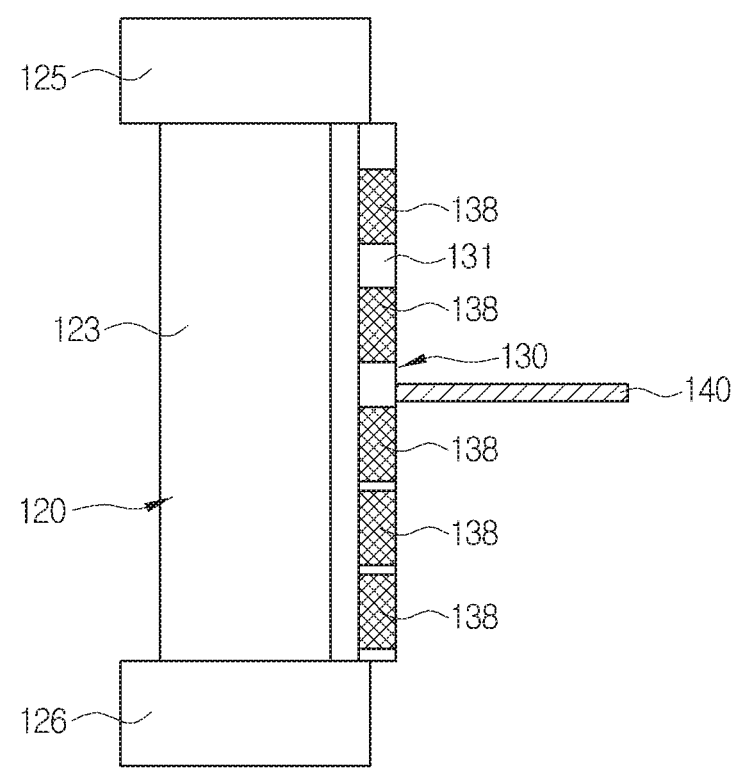

FIGS. 17 to 19 are sectional views showing a mounted state of the electric heater and the partition wall according to a modification of FIG. 16.

Referring to FIG. 17, as the first structure for separating the heat generating units 138 from the separation wall 140 in the vertical direction, the heat generating units 138 of the electric heater 130 are formed in odd numbers and are arranged asymmetrically on the basis of the separation wall 140 in the vertical direction. In this instance, the heat generating units 138 of the electric heater 130 are arranged much more at a lower part than at an upper part on the basis of the separation wall 140.

A lower air passageway 14a is a passageway where indoor air is introduced and circulated, and is a major part in which the air heated by the heater core 120 and the electric heater 130 flows during a heating mode. Therefore, in order to increase discharge temperature toward a passenger's feet, more heat generating units 138 of the electric heater 130 are eccentrically arranged at an area near to a foot zone in order to prevent increase of temperature of the separation wall 140 and enhance heating performance.

As shown in FIG. 18, if the heat generating units 138 are formed in even numbers, two or more heat generating units 138 may be arranged in the upper air passageway and two or more heat generating units 138 may be arranged in the lower air passageway on the basis of the separation wall 140. Moreover, as shown in FIG. 8, if the heat generating units 138 are formed in odd numbers, three or more heat generating units 138 may be arranged in the upper air passageway and three or more heat generating units 138 may be arranged in the lower air passageway on the basis of the separation wall 140.

Figure 20:
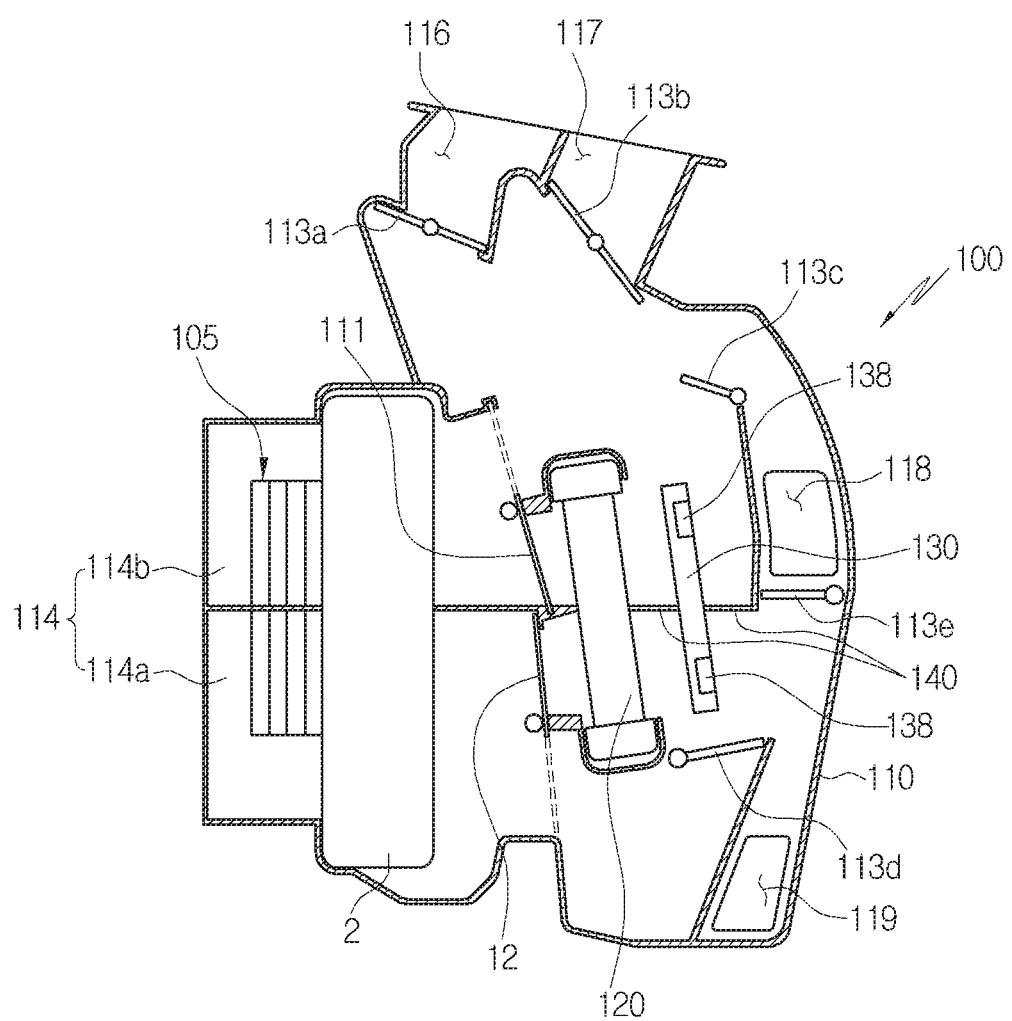
FIG. 20 is a sectional view of an air conditioner for a vehicle according to a fourth preferred embodiment of the present invention.
Figure 21:
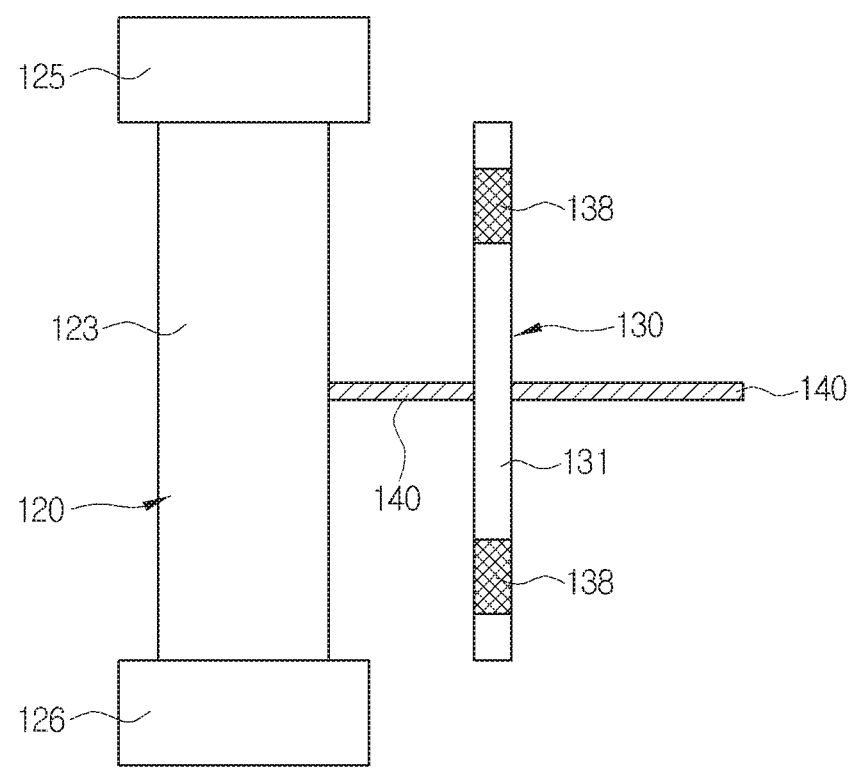
FIG. 21 is a sectional view showing a mounted state of an electric heater and a separation wall according to the fourth preferred embodiment of the present invention.

FIG. 20 is a sectional view of an air conditioner for a vehicle according to a fourth preferred embodiment of the present invention, and FIG. 21 is a sectional view showing a mounted state of an electric heater and a partition wall according to the fourth preferred embodiment of the present invention.

Referring to FIGS. 20 and 21, in the air conditioner for a vehicle according to the fourth preferred embodiment of the present invention, the electric heater 130 is arranged at the downstream side of the heater core 120 to be spaced apart from the heater core 120 in the air flow direction. In this instance, the separation wall 140 arranged between the heater core 120 and the electric heater 130 is arranged at a position corresponding to the heat radiating unit 131. As described above, besides the structure that the heater core and the electric heater are integrally combined with each other, in case of the structure that the heater core and the electric heater are spaced apart from each other, because the heat radiating unit 131 is arranged at the position corresponding to the separation wall 140, it prevents direct contact between the separation wall 140 and the heat generating units 138 to solve the thermal damage problem.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle, comprising:
an air-conditioning case including an air passageway;
a heating heat exchanger disposed inside the air-conditioning case and configured to exchange heat with air to heat the interior of the vehicle;
a perforated member disposed at a downstream side of the heating heat exchanger relative to an air back-and-forth direction and having a plurality of perforated holes through which the air passing the heating heat exchanger passes; and
at least one partition wall disposed between the heating heat exchanger and the perforated member to divide the air passageway of the air-conditioning case into a plurality of air passageways;
wherein the perforated member is an electric heater, and the at least one partition wall extends through the electric heater in the air flow back-and-forth direction of the electric heater and is slidably connected with the electric heater.

2. The air conditioner according to claim 1, wherein the at least one partition wall includes a front partition wall formed on a front surface of the electric heater and a rear partition wall formed on a rear surface of the electric heater opposite the front surface.

3. The air conditioner according to claim 2, wherein the front partition wall on the front surface of the perforated member extends away from the perforated member by a larger distance than the rear partition wall formed on the rear surface of the perforated member.

4. The air conditioner according to claim 1, wherein the at least one partition wall is arranged higher than a center of the electric heater in a vertical direction, wherein the vertical direction is parallel to the front and rear partition walls.

5. The air conditioner according to claim 4, wherein the partition wall is arranged at a 2:3 part of the electric heater in the vertical direction, and
wherein an interval between the heating heat exchanger and the perforated member is within a range of 2 mm to 20 mm, and more preferably, the interval between the heating heat exchanger and the perforated member is 10 mm.

6. The air conditioner according to claim 1, wherein the perforated member is an auxiliary heating heat exchanger or a dummy member.

7. The air conditioner according to claim 1, wherein the partition walls are detachably combined with the perforated member.

8. The air conditioner according to claim 1, wherein the perforated member comprises: a first combining groove formed in a side facing the heater core wherein the partition wall is inserted into the first combining groove; and a second combining groove 134 formed in the opposite side wherein the separation wall of the air-conditioning case is inserted into the second combining groove.

9. The air conditioner according to claim 1, wherein the at least one partition wall is made of a material with a higher degree of heat resistance than that of the air-conditioning case.

10. An air conditioner for a vehicle, comprising:
an air-conditioning case including an air passageway;
a heating heat exchanger disposed inside the air-conditioning case and exchanging heat with air to heat the interior of the vehicle;
an electric heater disposed at a downstream side of the heating heat exchanger and having a plurality of perforated holes through which the air passing the heating heat exchanger passes; and a front partition wall formed on a front surface of the electric heater and a rear partition wall formed on a rear surface of the electric heater opposite the front surface;

wherein a bridge unit is disposed between fixing portions of the at least one partition wall and the electric heater, wherein the bridge unit includes a first support part having a first component overlying the front partition wall and a second component at a right angle relative to the first component, and a second support part having a first component overlying the rear partition wall and a second component at a right angle relative to the first component; and a connection part connecting the first support part and the second support part with each other and inserted and joined into a fixing part of the electric heater.

11. The air conditioner according to claim 1, wherein indoor air and outdoor air are separately introduced into the air passageway of the air-conditioning case, and the air passageway is divided into an upper air passageway and a lower air passageway by a separation wall.

12. The air conditioner according to claim 11, wherein the electric heater includes heat generating units for generating heat by application of electric power and a heat radiating unit exchanging heat with air.

13. The air conditioner according to claim 12, wherein the heat generating units of the electric heater are arranged to be spaced apart from each other in a vertical direction.

14. The air conditioner according to claim 12, wherein the heat generating units of the electric heater are arranged symmetrically in a vertical direction.

15. The air conditioner according to claim 12, wherein the heat generating units of the electric heater are formed in odd numbers, and wherein the heat generating units of the electric heater are arranged much more at a lower part than at an upper part on the basis of the separation wall.

16. The air conditioner according to claim 12, wherein the electric heater is mounted in such a way that a center of the electric heater is located at the separation wall in a vertical direction.

17. The air conditioner according to claim 12, wherein a heater core for heating air by a cooling water heat source is included in the air-conditioning case, and the electric heater is integrally combined with the downstream side of the heater core in an air flow direction, wherein the heater core comprises: a first header tank and a second header tank disposed side by side to be spaced apart from each other;

a cooling water pipe disposed on the first header tank or the second header tank for introducing and discharging cooling water;

a plurality of tubes of which both ends are fixed to the first header tank and the second header tank to form a cooling water passageway;

pins interposed between the tubes; and a pair of side plates for supporting both sides of an assembly of the tubes and the pins, and wherein the electric heater includes a terminal unit for applying electric power to the heat generating units, the heat radiating unit is formed in a plate shape to fix the heat generating units, and end portions of the heat generating units and the heat radiating unit are supported by a housing.

18. The air conditioner according to claim 10, wherein the partition wall is arranged higher than a center of the perforated member in a vertical direction.

19. The air conditioner according to claim 10, wherein the partition wall is made of a material with a larger amount of heat resistance than that of the air-conditioning case.

20. The air conditioner according to claim 10, wherein indoor air and outdoor air are separately introduced into the air passageway of the air-conditioning case, and the air passageway is divided into an upper air passageway and a lower air passageway by a separation wall.

21. An air conditioner for a vehicle, comprising:

an air-conditioning case;

a heating heat exchanger located inside the air-conditioning case for heating an interior of the vehicle by exchanging heat with air;

an electric heater located inside the air-conditioning case;

the electric heater defining a plurality of perforated holes disposed at a downstream side of the heating heat exchanger;

partition walls formed on a front surface and a rear surface opposite the front surface of the electric heater to divide the air passageway of the air-conditioning case into several air passageways, wherein at least one of the partition walls is disposed between the heating heat exchanger and the electric heater.

* * * * *